US007580856B1

(12) United States Patent
Pliha

(10) Patent No.: US 7,580,856 B1
(45) Date of Patent: Aug. 25, 2009

(54) SYSTEMS AND METHODS FOR DISTRIBUTING TARGETED INCENTIVES TO FINANCIAL INSTITUTION CUSTOMERS

(75) Inventor: Robert Kenneth Pliha, McMinnville, TN (US)

(73) Assignee: Robert K. Pliha, McMinnville, TN (US)

( * ) Notice: Subject to any disclaimer, the term of this patent is extended or adjusted under 35 U.S.C. 154(b) by 1949 days.

(21) Appl. No.: 09/880,430

(22) Filed: Jun. 13, 2001

Related U.S. Application Data

(63) Continuation-in-part of application No. 09/296,997, filed on Apr. 22, 1999, now abandoned.

(60) Provisional application No. 60/083,174, filed on Apr. 27, 1998.

(51) Int. Cl.
*G06Q 30/00* (2006.01)
(52) U.S. Cl. .................. 705/14; 705/1; 705/10; 705/26; 705/27; 705/30; 705/34; 705/35; 705/38; 705/39; 705/40; 705/41; 235/380; 235/381; 235/382; 235/383
(58) Field of Classification Search .................. 705/14, 705/26, 27, 1, 10, 30, 34, 35, 38, 39, 40, 705/41; 235/380, 381, 382
See application file for complete search history.

(56) References Cited

U.S. PATENT DOCUMENTS

| | | | |
|---|---|---|---|
| 3,505,646 | A | 4/1970 | Afel, Jr. et al. |
| 3,716,697 | A | 2/1973 | Weir |
| 3,941,977 | A | 3/1976 | Voss et al. |
| 3,959,624 | A | 5/1976 | Kaslow |
| 4,114,027 | A | 9/1978 | Slater et al. |
| 4,247,759 | A | 1/1981 | Yuris et al. |
| 4,365,148 | A | 12/1982 | Whitney |
| 4,415,065 | A | 11/1983 | Sandstedt |
| 4,415,802 | A | 11/1983 | Long |

(Continued)

FOREIGN PATENT DOCUMENTS

| WO | WO 9723838 A1 | * | 7/1997 |
|---|---|---|---|
| WO | WO 9726061 A1 | * | 7/1997 |

OTHER PUBLICATIONS

"UK: Innovative Experiment by American Express", Gale Group Globalbase(TM) : Sunday Times ( ST ), Apr. 15, 1996 p. 5.13.*

*Primary Examiner*—Jean D. Janvier
(74) *Attorney, Agent, or Firm*—Kilpatrick Stockton LLP

(57) ABSTRACT

An incentive distribution system is used in distributing, tracking and redeeming product incentives offered by manufacturers and distributors of consumer goods through a financial institution. A financial institution distributes an incentives list to each of its customers, based on information relating to the customers, containing the incentives relating to the category for which the customer qualifies. Qualifying criteria includes transactional activity within the account held with the financial institution distributing the incentives, demographic data relating to the customer, and various account data. The system tracks purchases made by a customer at a participating retailer or dealership and updates the customer's qualifications based on these purchases. Further, the financial institution acts as a redemption warehouse by debiting the accounts of the manufacturers and distributors offering the incentives and crediting the accounts held by the retailers and dealerships honoring the incentives.

19 Claims, 21 Drawing Sheets

U.S. PATENT DOCUMENTS

| | | |
|---|---|---|
| 4,419,573 A | 12/1983 | von Geldern |
| 4,554,446 A | 11/1985 | Murphy et al. |
| 4,670,853 A | 6/1987 | Stepien |
| 4,672,377 A | 6/1987 | Murphy et al. |
| 4,674,041 A | 6/1987 | Lemon et al. |
| 4,703,423 A | 10/1987 | Bado et al. |
| 4,722,054 A | 1/1988 | Yorozu et al. |
| 4,723,212 A | 2/1988 | Mindrum et al. |
| 4,750,119 A | 6/1988 | Cohen et al. |
| 4,791,281 A | 12/1988 | Johnsen et al. |
| 4,882,675 A | 11/1989 | Nichtberger et al. |
| 4,885,685 A | 12/1989 | Wolfberg et al. |
| 4,908,761 A | 3/1990 | Tai |
| 4,910,672 A | 3/1990 | Off et al. |
| 4,941,090 A | 7/1990 | McCarthy |
| 4,949,256 A | 8/1990 | Humble |
| 5,056,019 A | 10/1991 | Schultz et al. |
| 5,128,752 A | 7/1992 | Von Kohorn |
| 5,305,195 A | 4/1994 | Murphy |
| 5,305,197 A | 4/1994 | Axler et al. |
| 5,353,218 A | 10/1994 | De Lapa et al. |
| RE34,915 E | 4/1995 | Nichtberger et al. |
| 5,502,636 A | 3/1996 | Clarke |
| 5,612,868 A | 3/1997 | Off et al. |
| 5,619,558 A * | 4/1997 | Jheeta ..................... 379/92.01 |
| 5,649,114 A * | 7/1997 | Deaton et al. .................. 705/14 |
| 5,689,100 A * | 11/1997 | Carrithers et al. ............ 235/380 |
| 5,710,886 A | 1/1998 | Christensen et al. |
| 5,734,838 A | 3/1998 | Robinson et al. |
| 5,857,175 A * | 1/1999 | Day et al. ..................... 705/14 |
| 5,945,653 A * | 8/1999 | Walker et al. ............... 235/380 |
| 6,009,415 A | 12/1999 | Shurling et al. |
| 6,321,208 B1 * | 11/2001 | Barnett et al. .................. 705/14 |
| 6,434,534 B1 * | 8/2002 | Walker et al. .................. 705/14 |
| 6,631,358 B1 | 10/2003 | Ogilvie |
| 7,296,734 B2 | 11/2007 | Pliha |
| 2002/0194122 A1 | 12/2002 | Knox et al. |
| 2008/0120155 A1 | 5/2008 | Pliha |

\* cited by examiner

StateNational Bank of Pensacola

INCENTIVES LIST
Reward Discounts $ 510.50

Fasts Supermarkets
| | |
|---|---|
| Grocery | Savings |
| Coca-Cola, 6-Pack | 1.50 6-pack |
| Campbell Soup | .50 16 oz |
| Produce | |
| Bananas | .35 per lb. |
| Seedless Grapes | .45 per lb. |

Golds Jewelers
Movado Watches, all models   $50.00 off

Village Silversmiths
Sterling Silver MoneyClip   $15.00 off

MegaMart
| | |
|---|---|
| Leather Wallets, Buxton #334 | $5.00 off |
| Samsonite Luggage, all | 15% off |
| Levi's, children's | 25% off |

PC Computer Direct
| | |
|---|---|
| Pentium 300 PC, #4470 | $1435.00 |
| 17" Monitor | $375.00 |
| P-H Printer #588 | $229.00 |

Playhouse on the Green
Phantom of the Opera   $65.00

Bests Sea House Restaurant
All appetizers, with regular entrees,
Monday – Thursdays   Free Total Rewards to Date  $896.80

DISCLAIMER
The value of this discount reward is not more than 1/64 of one cent.

FIGURE 3B

FINANCIAL INSTITUION

MONTHLY ACCOUNT STATEMENT

FINANCIAL INSTITUION

TELEPHONE/CALL CENTER BANKING

SYSTEMS AND METHODS FOR DISTRIBUTING TARGETED INCENTIVES TO FINANCIAL INSTITUTION CUSTOMERS

RELATED APPLICATIONS

This application is a continuation-in-part of co-pending non-provisional patent application Ser. No. 09/296,997, filed on Apr. 22, 1999, entitled "System and Method for Coupon, Loyalty Reward Distribution or Promotion Targeting Based on Customer Decile Parameters, Category Activity or Key Prior Behavior Using Financial Institutions Customer Database Parameters and Retail Delivery Network," which claims priority to provisional patent application Ser. No. 60/083,174, filed on Apr. 27, 1998, entitled "System and Method for Coupon, Loyalty Reward Distribution or Promotion Targeting Based on Customer Decile Parameters, Category Activity or Key Prior Behavior Using Financial Institutions Customer Database Parameters and Retail Delivery Network."

FIELD OF THE INVENTION

This invention relates to systems and methods for offering customer incentives and, more particularly, to systems and methods for targeting incentives to customers of financial institutions based on each customer's financial or demographic data, or both.

BACKGROUND OF THE INVENTION

Retailers, distributors, and manufacturers use incentives of various descriptions to increase consumer purchases and foster consumer loyalty. One of the more common techniques is a coupon which entitles the consumer to a discount off of the price of the goods or services. A common type of incentive with manufacturers is a rebate through which the consumer can obtain some money back if they perform some additional step, such as mailing in a rebate form to the manufacturer with proof of purchase.

Manufacturers have traditionally used promotional vehicles such as newspaper, Free Standing Inserts (FSI), printed circulars, television, radio, billboards, other forms of mass media advertising, and direct mail marketing techniques to reach consumers. In 1996, manufacturers of consumer package goods (CPG) spent over $70 billion on promotional strategies designed to support their brands. A growing diversity of lifestyles and a profound expansion in the amount of information delivered to increasingly fragmented consumer segments have contributed to brand proliferation and a perceived decline in brand loyalty. At the same time, changes in the workforce, increases in the amount of advertising space available via television and shifts in demographics have made it harder for manufacturers to use traditionally mass distributed and untargeted promotional methods to reach potential customers. Consequently, conventional advertising and untargeted promotional strategies have become less efficient because such efforts are reaching fewer potential customers.

While CPG manufacturers have recognized the limitations of traditional promotional vehicles in reaching consumers efficiently, such marketing tools remain prevalent. Over 306 billion coupons were distributed in the United States in 1996. In comparison, only 237 billion coupons were distributed in 1986. While the number of coupons distributed has increased, the redemption rate has decreased during the same period from an average of 2.8% in 1986 to an average of 1.8% in 1996, thereby illustrating the limitation of this promotional tool. Even so, consumers have continued to recognize the value of coupons by redeeming them for an estimated $3.7 billion of savings in 1996.

As a result of the declining redemption rates for coupons, spending by CPG manufacturers on FSIs declined for the first time, from $7 billion in 1995 to $6 billion in 1996. In spite of the decreasing effectiveness of the more traditional promotional methods, such as coupons and mass media, and the decreasing expenditures by manufacturers on promotional methods and incentives, manufacturers have maintained the previous level of overall investment in brand promotions by spending more of their funds allocated to promotions on more targeted incentive vehicles. Promotional spending through direct marketing, including targeted free sample give-aways and other direct to consumer programs, increased 6% from 1990 to 1996.

In order to more efficiently invest in promotional items and to better communicate with potential customers, retailers have developed systems which identify individual households by their product purchasing histories. These systems allow retailers to track and analyze their customers according to sales and profit margins. Further, retailers have used these systems to reward the customers accordingly. CPG manufacturers have be willing to pay processing fees to system or network providers upon realizing the potential of electronically issued discounts. These processing fees have included fixed amounts and percentages of a discount amount. Typically, the processing fee has been paid after a redemption has been processed.

In order to further increase the effectiveness of incentive programs, retailers have begun to institute changes in their approach to communicating with their customers by investing in technology which improves efficiency and inventory management. Advances in point of sale technology, in addition to increases in checkout efficiency and developments in price and inventory control, have provided retailers with a platform to identify their customer base. Through use of this platform and these technological advancements, retailers have been able to develop programs that permit them to capture information about their customers' purchasing habits and to communicate with targeted segments of their customer base.

More recently retailers have shifted their focus to the 20% to 25% of their customer base that accounts for approximately 70% to 80% of their total sales. In an effort to foster relationships with these customers, retailers have used loyalty-building frequent shopper card programs in order to establish a direct means of communication with these most important customers.

One such system is taught in U.S. Pat. No. 5,056,019 issued to Schultz et al. where an automated purchase reward accounting system automatically tracks the purchasing behavior of consumers who are participants of a marketing program. Specifically, the marketing program disclosed in Schultz includes a booklet having incentive rewards for participating customers who make purchases of specific quantities of each participating manufacturer's product, as designated in the incentive book. The system tracks all purchases made by a consumer through the use of a consumer identification card having a computer-readable magnetic strip or, alternatively, a non-machine-readable consumer identification card. The consumer identification card is used to identify the purchases made by participating consumers. Each purchase made by a participating consumer is stored in a data collector at the retail store. The stored consumer data is used to compare the consumer's purchases with the incentives offered by the manufacturers in order to generate a reward certificate. Each participating customer receives a reward certificate which reflects all of the purchases made by the consumer of items corresponding with incentives offered by participating manufacturers. The reward certificate may either be in the form of a check or a redeemable coupon capable of redemption at a participating retailer.

While Schultz teaches an automated method for tracking consumer spending at a retail store, Schultz does not disclose a method for tracking consumer spending in multiple stores. In other words, the marketing program disclosed in Schultz is only available to track those consumer purchases made with a single company with whom the consumer had taken the proactive step to join the marketing program prior to making the purchase. Thus, the program disclosed in Schultz requires that a consumer obtain a separate consumer identification card for each different company. Additionally, the system does not provide the customer with cost savings at the point of purchase. Rather, the customer receives a reward certificate at a later point in time. Generally, such systems are not as favored by customers who desire simplicity, convenience and immediate benefits.

In an implementation of the system disclosed in Schultz, the redemption process was placed in the hands of a central management firm or third-party processing institution. The incentive program shifted the processing of the manufacturers' product discounts and redemption process from the retailer and manufacturers to a third-party institution. This third-party institution controlled and managed the discount redemption process, provided an electronic clearinghouse for discount redemptions, determined the consumers' behavioral purchasing habits, and issued additional discount rewards based on consumer purchasing habits of the retailers' customers.

A deficiency with this system was that retailers and manufacturers had to exchange their customer database information with the third-party processor institution. This system did not excel in part because it did not take into account the security and proprietary concerns in providing customer databases information to a third-party institution. Retailers did not, and do not, want manufacturers to have names and addresses or purchase histories of their customers. If customer data were going to be sold, as the case with the Schultz economic model, the retail grocers wanted the revenue. Additionally, because of the control the third party institution had on the data, the retailers and manufacturers were dependent on the third-party institution for controlling the product discount redemption, statistical tracking, and reporting of their customer activity. This shifting of the discount processing responsibility was viewed by many retailers and manufacturers as a fatal drawback.

Yet another deficiency with the implementation of Schultz was from the consumer's perspective. Many shoppers were reluctant to provide demographic data and collectively found that the reward was small and not immediate. Their attitude was that if the manufacturer was going to give them a discount, give it to them now rather than mailing them a rebate voucher later.

CPG manufacturers and retailers are not the only ones to employ some type of incentive program. For example, incentive programs have been used by financial institutions, specifically banks, in an effort to encourage increases in electronic transactions with customer accounts that are transaction intensive, thereby reducing the workload associated with these accounts. U.S. Pat. No. 5,734,838 to Robinson, et al., describes an incentive program which rewards a customer of a financial institution for making transactions with the institution through particular electronic means, such as an automated teller machine (ATM). A bank customer participates in the incentive program by maintaining an incentive program account balance and receives incentive points for each electronic transaction with the bank. For each electronic transaction, a customer receives incentive points with the value of the incentive points being based on the exact type of transaction made by the customer. These points can be used to purchase or receive free products, such as free airline tickets or free services. If a customer has insufficient incentive points to receive a free airline ticket, the balance owed is debited against the customers incentive account balance. Robinson states, in part, that objects of the invention are to encourage electronic type transactions as opposed to manual transactions and to encourage the transfer of assets from transaction static accounts to transaction intensive accounts, thereby requiring additional services from the administering institution. Thus, the system of Robinson is designed to generate more fees for the financial institution.

The incentive program taught in Robinson focuses on a bank rewarding its customers for performing transactions electronically rather than manually, thereby reducing the workload necessary to maintain the account while increasing the amount of fees generated as a result in an increase in the number of transactions made with an account. Further, the system rewards customers for making particular types of transactions. For instance, the bank could program the system to issue a greater amount of incentive points for transactions in which the bank charges customers a larger fee than for transactions which the bank charges a smaller fee, or no fee at all. Thus, Robinson discloses a system capable of rewarding a bank customer with incentives that are issued based upon the type of transaction made by that customer.

While retailers and manufacturers have sought to increase the efficiency of coupons, rebates and other incentives offered to consumers, systems available to date have failed to effectively target consumers and distribute these incentives. For instance, these systems rely on customers to proactively enter marketing programs for each retailer independently. Such a system lacks the convenience and the simplicity necessary to make the program desirable. Further, these systems do not target new customers, but merely foster currently existing relationships with previous customers. Still yet, other systems which seek new customers fail to make a determination as the likelihood of the person becoming a customer.

SUMMARY OF THE INVENTION

The present invention relates to systems and methods for identifying at least one incentive for financial institution customers. The systems receive incentive information from participants of the systems and receive data from financial institutions relating to the customer. The systems analyze a customer's financial data and select the desired incentive from a plurality of incentives for the customer based on the results of the analyzing.

The systems of the invention can be used for distributing, tracking and redeeming product incentives offered by manufacturers and distributors of consumer goods, including food and non-food alike, to customers of a financial institution. A preferred system, referred to as an incentive distribution system, uses data stored within the financial institution's customer database, the retail delivery network of the financial institution, and the automated clearinghouse of the financial institution. The incentive distribution system can be implemented at any financial institution including, but not limited to, a commercial bank, a savings bank, an investment bank, a mortgage bank, a mortgage broker, a thrift institution, a savings and loan association, a trust company, a credit/debit card company, a third party bank data processor, a credit union, an insurance company, a brokerage firm, a mutual fund company, or other similar type organization within the financial service industry.

The incentive distribution system is a technological advanced form of electronic targeted marketing and customer management which incorporates mass marketing and micromarketing methods. The incentives are distributed to customers of a financial institution using the financial institution's distribution network and are offered to reward the customers for desired behavior, such as continued patronage of a brand at a level that improves a manufacturer's profits. Rather than using shelf-distributed coupons, purchase-triggered coupons, or card programs, the incentive distribution system enables manufacturers, distributors, dealers and retailers to offer individually targeted, customer-specific purchase incentives to millions of consumers through the delivery networks of financial institutions. The incentives may include, but are not limited to, discount coupons, rebate incentives, buy one get one free offers, product rewards and frequent shopper rewards. Distributing these incentives through a financial institutions network produces a distribution channel that addresses more than 150 million consumers nationally.

The incentive distribution system is structured to operate in an open architecture environment and on a fully scalable platform. The information stored within a financial institution and its databases is updated in real time. The databases of each financial institution are capable of defining the incentives that are to be offered to each customer of the financial institution. Each financial institution's database that is used as a customer database is updated and transmitted to each participating retailer daily.

The present invention can be used to implement a real-time interactive network within a financial institution's central computer system capable of tracking, controlling, distributing, and redeeming product incentives provided by manufacturers and distributors through a network of participating retailers and dealerships. Additionally, retailers and dealerships may also provide incentives. The product incentives are proffered and issued to the financial institution's customers through a plurality of peripherals used by both customers and bank employees. These peripheral devices are used by financial institutions to provide services and to support their customers. The peripheral devices may include devices such as automated-teller-machines (ATM), in-bank teller processing, monthly account statements, customer service representative (CSR) account inquiries, direct mailings, telephone or call center home banking, PC or Internet home banking, card-based credit, debit, or smart cards used over LAN and WAN networks, and others.

The product incentives offered to customers of a financial institution can be categorized into decile reward levels. The decile reward levels are categorized based on a customer's transaction activity, account data and demographic data. In turn, each decile reward level is offered to customers falling within the criteria assigned to each decile reward level. Assignment of decile reward levels is determined by the marketing criteria specified by each financial institution, manufacturer, distributor, dealership and distributor.

Once a customer of a financial institution receives an incentives list, the incentive distribution system tracks the movement of the customer through the retailer or dealership network. Each transaction made by the customer is recorded by the retailer or dealership with whom the transaction was made and transmitted to the financial institution. The incentive distribution system is implemented using a plurality of integrated databases located within financial institutions, retailers, dealerships, current point-of-sale locations and order processing systems.

When a financial institution customer has been detected at a retailer or dealership checkout location, a transaction log is compiled and communicated to the financial institution. The financial institution's central computer system or designated outsourcing intermediary referred to as a system manager sorts the transaction log in order to determine whether the transaction corresponds with an incentive offered by a manufacturer or distributor. A financial institution can appoint a third-party company to manage and control the network administration. After sorting the transaction log, the financial institution's redemption system manages and controls the redemption process between the financial institution, retailers, distributors, manufacturers and dealerships.

One advantage that is realized by allowing the financial institution to control the redemption process is the reduction in fraudulent redemptions and the miscalculation of the discount amount or percentage charge incurred by the manufacturer or distributor. The financial institution provides the retailers, dealerships, manufacturers and distributors with access to an Automated-Clearing-House (ACH) system, or an equivalent electronic funds transfer system, to transfer the redemption funds. In operation, the financial institution receives the redemption fee and automatically debits and credits the bank accounts held by the retailers, dealerships, manufacturers, and distributors in a real-time environment.

The incentive distribution system assists financial institutions in attracting new customers, obtaining new interest-bearing accounts, offering inducements for customers to obtain loans, providing means for cross-selling other financial products or services to their customers, and furnishing the institutions with new revenue streams. Distributing consumer product incentives through a financial institution network can greatly increase the "coupon" redemption yield while reducing the distribution cost to the consumer product manufactures and distributors.

The incentive distribution system can motivate customers of a financial institution to use cards such as ATM, Debit, Credit, or Smart Cards as an alternative to frequent shopper membership cards, or to use the aforementioned cards when a participating retailer does not have a frequent shopper program in operation. Using a card listed above to identify a customer at a retailer's point of service (POS) checkout location is an alternative method of tracking a customer's usage of the product incentives offered by the financial institution.

The product incentives can be issued to customers in the form of a journal type incentives list or printer generated discount report. Such a format is advantageous as compared with traditional discount "single" coupons because the report concisely details all of the incentives on one piece of paper. Further, the journal type format for an incentives list is more effective and produces higher "coupon" redemption yields than traditional product discount distribution methods. Moreover, issuance of the incentives through a financial institution's retail network yields a higher rate of redemption because customers of a financial institution are particularly observant of information received from transactions issued by a financial institution. Therefore, the customer of a financial institution is more likely to review and to take advantage of a list if incentives originating from a financial institution than incentives originating from another source.

BRIEF DESCRIPTION OF THE DRAWINGS

The accompanying drawings, which are incorporated in and form a part of the specification, illustrate preferred embodiments of the present invention and, together with the description, disclose the principles of the invention.

FIG. 3B is an example of an incentives list.

DETAILED DESCRIPTION OF THE DRAWINGS

I. Overview

Figure 1A:
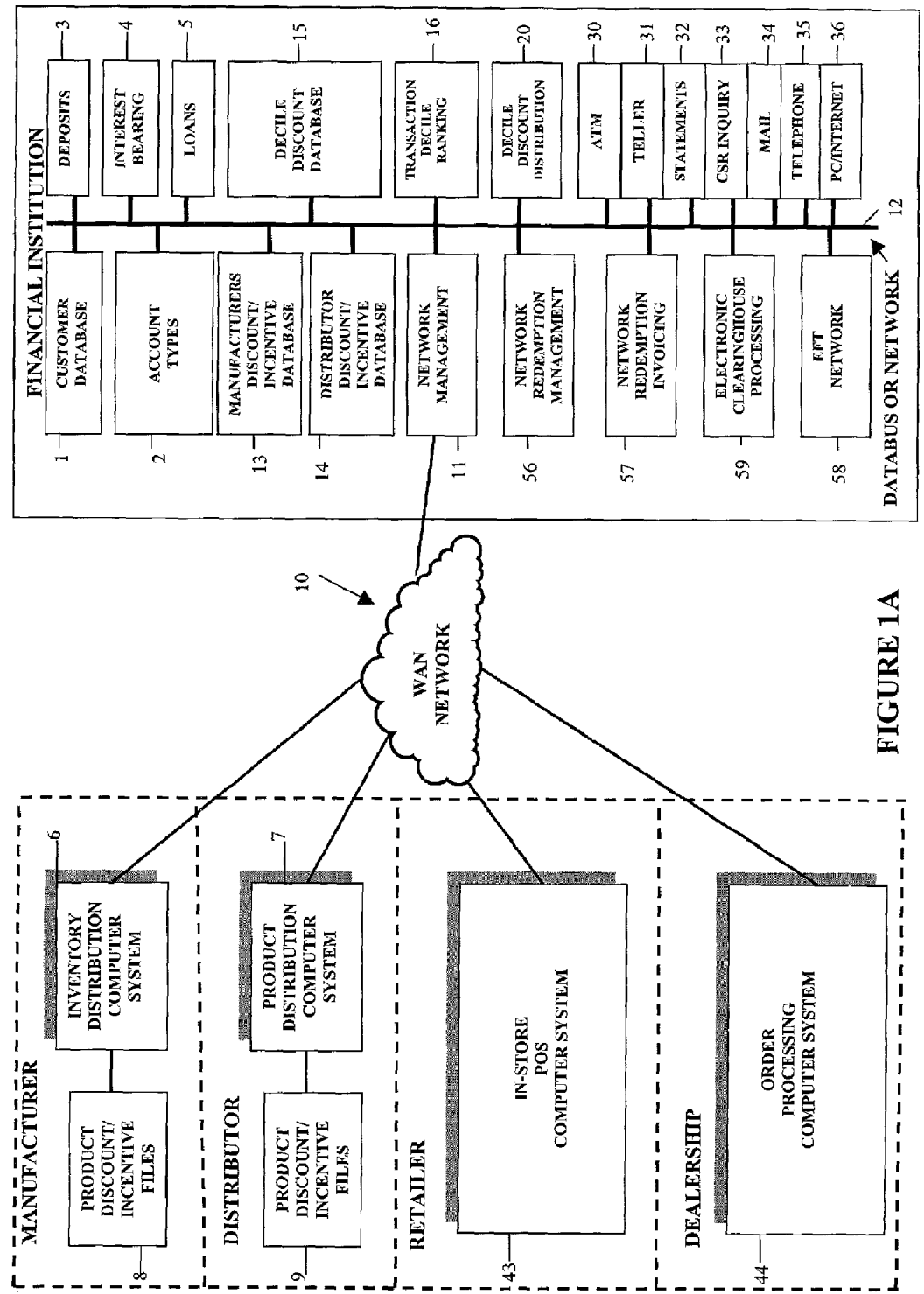
FIG. 1A is a block diagram of the incentive distribution system of the present invention.

This invention relates to systems that manage the distribution of incentives to customers of a financial institution. A financial institution may include, but is not limited to, banks, credit unions, brokerage houses, and mutual fund management groups. The systems employ the databases of a financial institution, or those databases maintained by third-party processors for use in the financial industry, to determine which incentives should be extended to a customer of the financial institution, a customer defined as all entities purchasing an a service, product or other item from the financial institution and includes, but is not limited to, an individual or a corporation. The incentives are grouped into categories and distributed to customers based on predetermined criteria. The incentives available to the customers of the financial institution may include, but are not limited to, discount coupons, rebate incentives, buy one get one free offers, product rewards and frequent shopper rewards. Each customer receives notification of the incentives within the category for which the customer qualifies. The incentives are distributed to the customers through the financial institution's communications network, which includes, but is not limited to an ATM, direct mail, electronic mail, monthly account statements, Internet access, a bank teller, a customer service representative (CSR), or a telephone communication.

The systems preferably rank the incentives into categories, which may be decile rankings. The categories are established by the entity offering the incentive with the intent of placing the incentives in the hands of consumers most likely to purchase the product and to become a repeat customer. Whether a customer is eligible to receive the incentives grouped within a particular category is based on the customer's transactional activities regarding the accounts held by that customer within the financial institution, the customer's demographic data and the customer's account data.

The systems preferably further track, sort, and store the purchases made by customers of the financial institution. Specifically, purchases made by a customer of a financial institution are tracked whenever a customer makes a purchase at a participating retailer and notifies the participating retailer that the purchase made is to be recorded within the system. These transactions can be tracked through the use of cards containing a magnetic swipe strips, visual identification numbers, or uniform product codes (UPC). Alternatively, the customer may notify the retailer of its individual number to be correlated with the transaction. Each transaction made by a customer at a participating retailer is transmitted to the financial institution, or system manager, for processing and storing.

Additionally, the systems act as a clearinghouse for those transactions made by customers which are eligible for the incentives offered. Specifically, the systems use the databases of the financial institution, or those of a third party clearinghouse network, to debit the account of the entity offering the incentive and to credit the account held by the entity from whom the item was purchased.

II. Platform Structure

A targeted distribution system according to a preferred embodiment includes a financial institution and all manufacturers, distributors, retailers and dealerships participating within the incentive program, as shown in FIG. 1A. The financial institution includes a complex network capable of managing customer accounts, determining customers eligible to receive groupings of incentives, determining the groupings of incentives, controlling the redemption process for the incentives and storing the transaction information of transactions made by the consumers.

In the preferred embodiment, the financial institution manages accounts held by its customers through the use of a customer database 1. Typically, the financial institution manages multiple account types 2, including, but not limited to, demand deposit accounts (DDA) 3, interest bearing accounts 4 or loan accounts 5. The system uses the transaction activity of the accounts held by the institution's customers in order to determine which incentives each customer should receive, to assign an incentive level, and to calculate a decile ranking. The system is capable of distributing incentives which include, but are not limited to, discount coupons, rebate incentives, purchase rewards, or other marketing incentives.

Each participating manufacturer is prompted to submit an incentives matrix. The incentive matrix can be communicated to the financial institution directly from the marketing and promotion department of the manufacturer, through the manufacturer's inventory distribution system 6 or through the distributor's product distribution system 7. The incentives matrix may be generated by either a manufacturer's inventory distribution system 6 or distributor's product distribution system 7. The product discount files 8 or product purchase incentive files 9 are transmitted by the manufacturer to the financial institution through a TCP/IP or other communication protocol wide-area-network (WAN) 10. The WAN 10 provides the information technology (IT) that allows all of the participants in the distribution program to be inter-linked through means of a common global TCP/IP or other communication interface. The network may transmit incentives either in real time or through a batch communication process. The network communication is controlled within the financial institution by the network management module 11. Typically, an IBM SNA/SDLC LU.6.2 protocol is used to inter-link the participants and to transmit the incentives to the customer. However, any protocol capable of transmitting data may be used to connect the systems.

Figure 1B:
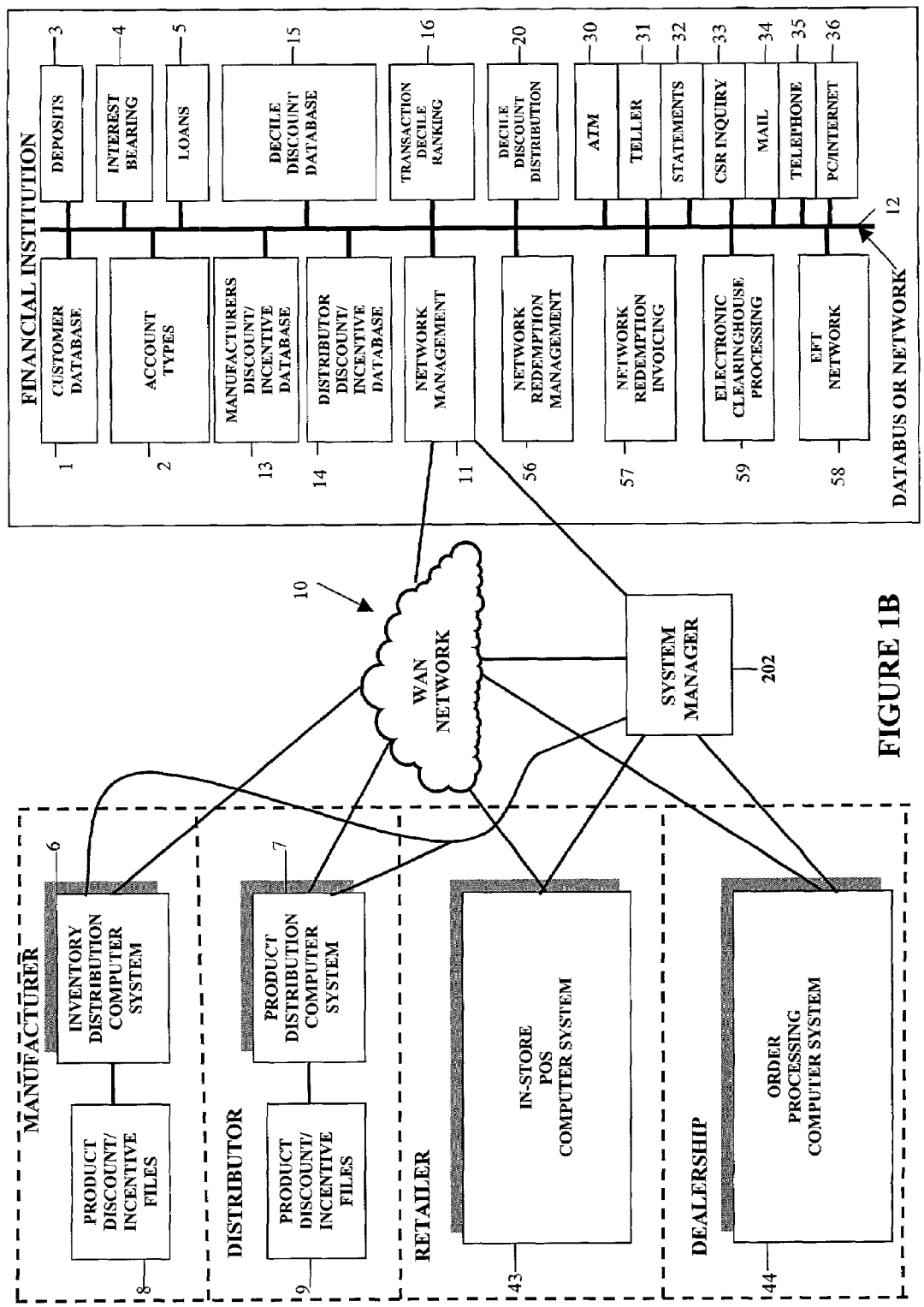
FIG. 1B is a block diagram of the incentive distribution system of the present invention including a system manager.

In another embodiment, as shown in FIG. 1B, the incentive matrix can be communicated to a system manager 202 through the manufacturer's inventory distribution system 6 and through the distributor's product distribution system 7. The product discount files 8 or product purchase incentive files 9 are transmitted by the manufacturer to the system manager 202 through a TCP/IP or other communication protocol wide-area-network (WAN) 10. The system manager 202 collects promotional data from at least one of the manufacturers and retailers, or both. The system manager 202 may transmit incentives to a financial institution either in real time or through a batch communication process.

III. Incentives

The incentives offered by participants and conveyed to the consumers by a financial institution may include, but are not limited to, discount coupons, rebate incentives, buy one get one free offers, product rewards and frequent shopper rewards. Participants are those entities or individuals offering incentives and may include, but not limited to, manufacturers and distributors. The system modules used by the financial institution to produce decile rankings and to distribute the incentives are integrated through a common computer data bus or network system 12 that controls the financial institution's information systems (IS) network. The financial institution's network may include, but is not limited to, an Ethernet, a Virtual Private Network (VPN), an IBM Token-Ring network convention, or other local area network. Preferably, the incentive distribution system operates in an on-line environment. However, the incentive distribution system is equally capable processing off-line transactions which are a part of a financial institution's proof department end-of-day reconciliation process.

After a financial institution receives incentives from participating manufacturers and distributors, the manufacturer discount/incentive database 13 and the distributor discount/incentive database 14 are established within the incentive distribution system. The financial institution controls distribution of the incentives by first mapping distribution of the incentives to a decile discount/incentive database array 15. The ranking of each transaction 16 is a decision made by each participating financial institution individually.

In another embodiment, the system manager 202 receives incentives from participating manufacturers and distributors rather than a financial institution. The system manager 202 may be composed of an entity that is distinct from the manufacturers, distributors, or financial institutions, such as an independent company. Further, the system manager 202 may be a subsidiary or a division of a financial institution, a manufacturer or a distributor. The manufacturer discount/incentive database 13 and the distributor discount/incentive database 14 are established within the system manager 202. The system manager 202 controls distribution of the incentives by first mapping distribution of the incentives to a decile discount/incentive database array 15. The ranking of each transaction 16 is a decision made by the system manager 202.

Figure 1C:
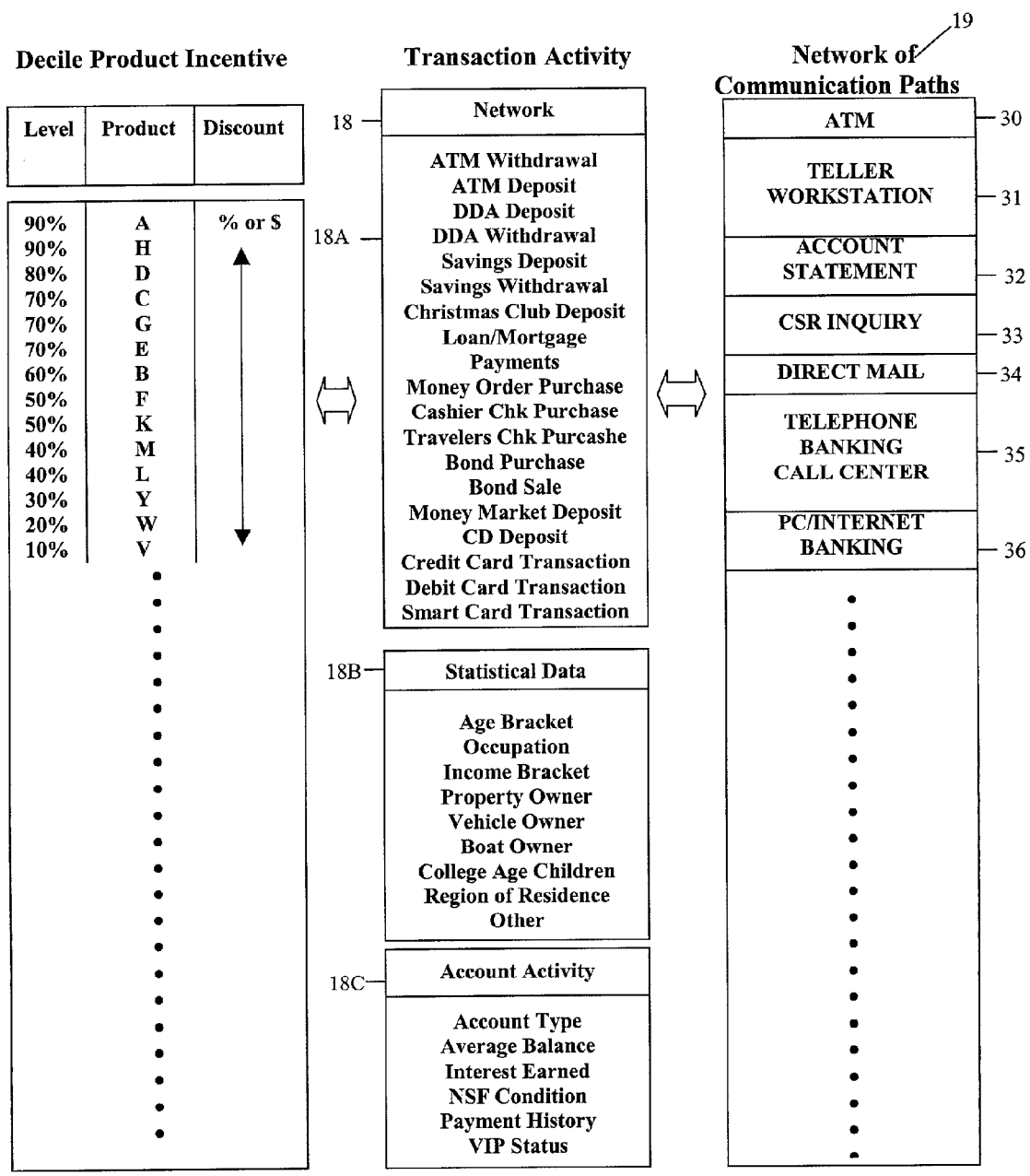
FIG. 1C depicts a decile product discount database, a transaction activity database and a computer network contained within financial institutions.

The decile product incentive database 17, as illustrated in FIG. 1C, includes all products corresponding to incentives offered by participating manufacturers, distributors and retailers. Each product is assigned a particular type of incentive together with the degree of incentive. For instance, product A of the decile product incentive database 17 may be assigned a 30% off coupon, a buy one get one free incentive, a rebate of five dollars off the customer's next purchase of the same product or any other marketing incentive. Each product is assigned a decile level by the financial institution. Alternatively, the product may be assigned a decile level by the system manager 202. The products are assigned decile levels based upon the level, amount and type of transactions made by each customer regarding the accounts held by the customers with the financial institution.

Alternatively, the manufacturers, distributors, dealerships and retailers may decide in which category their product and corresponding incentive should be placed. In this fashion, the decision to place a product into a specific decile category may be based on the customer's demographics, including, but not limited to, the customer's age, sex, location of residence, boat owner, car owner, college age children, occupation, income bracket or other criteria. The decile product discount database 17 stores the decile level for each product together with the corresponding discount, incentive, or rebate offered at the participant's discretion. In one embodiment, the decile product discount database 17 is located in a financial institution. In another embodiment, the product discount database 17 is located in a system manager 202. The criteria used to assign these incentives is based upon each financial institution's objectives which may include motivating their customers to certain transactions over others or promoting awareness of specific financial product or service offerings.

The decile system is intended to consolidate the incentives into groupings or categories in order to more effectively distribute the incentives to the customers most likely to take advantage of the incentive, thereby creating or fostering a relationship between the customer and the retailer, manufacturer, or distributor. Alternatively, the ranking system may include divisions other than a decile system. For instance, the system may categorize the incentives through a list including two divisions or any number of divisions greater than two.

Thus, the decile ranking system may include more or less than ten categories and may be differently designated.

IV. Data

Data includes all information relating to a customer of financial institution including, but not limited to, financial data, which further includes statistical data and account activity, total assets, total liabilities, number and type of accounts, and lines of credit. The data also includes customer demographics which includes, but is not limited to, the customer's age, sex, location of residence, boat owner, car owner, college age children, occupation, and income bracket.

The financial institution and the participating network of manufacturers, distributors, dealerships and retailers determine the decile levels assigned to each customer of the financial institution based on the customer's transaction activity stored in the financial institution's customer database 1. Additionally, the financial institution, manufacturers, distributors, dealerships and retailers may determine to offer an incentive to a customer based upon the statistical data of the customer and known by the banking institution, as shown in FIG. 1C. In another embodiment, a system manager 202 assigns the decile levels to each customer of a financial institution based on the customer's transaction activity.

The transaction activity database 18 is divided into three tiers: 18(A) network transactions list, 18(B) statistical transactions, and 18(C) account transactions. The network transactions list 18(A) includes a partial list of different transactions which may be conducted by a customer and tracked by the financial institution. In another embodiment, the tracking of the customer's transactions is completed by the system manager 202. The financial institution may also correlate the transactions made by the consumer with the statistical data of the consumer 18(B). Thus, the manufacturers, distributors, dealerships and retailers may distribute incentives to the customer based on the personal information of the customer, including interests, assets held such as, but not limited to, a boat, an automobile, or a house, family life or other factors which influence purchasing decisions made by consumers. Further, the manufacturers, distributors, and retailers may target a specific age group by correlating a discount to the age group and further correlating the discount to a decile level.

Additionally, the transaction activity database 18 stores the type of account activity 18(C) conducted by a customer. For instance, it is advantageous for a manufacturer, distributor, dealership or retailer to have the ability to target a customer based upon the type of transaction made. Specifically, a manufacturer offering an incentive relating to a product used in home renovations would probably like to target a customer who recently took a second mortgage on his home. Further, a retailer may want to target all those customers who make numerous transactions through an ATM in order to target consumers more likely to make impulse purchases. Thus, the account activity 18(C) portion of the database allows an entity offering an incentive to target distribution of the incentive based on various account criteria.

The network of communication paths 19 is a list of the means by which a financial institution may communicate with an account holder. Further, this network of communication paths 19 may used to distribute the incentives to the customer. Alternatively, the incentives offered through an embodiment of the instant invention may be offered to a customer of the financial institution through any means of communication available to the institution.

In operation, a customer receives incentives once the customer satisfies the pre-established requirements associated with a decile level corresponding to the particular incentive. For instance, if a financial institution determines that a 30% decile level corresponds to consumer activity of 20 or more ATM transactions in a single month, then a customer performing 20 ATM transactions within a single month would receive the incentives corresponding to the 30% decile level. Alternatively, the determination of a decile level could be made by a system manager 202. Further, if a manufacturer selectively targets customers that are between the ages of 35 to 40, then the manufacturer may place its incentives within the decile level corresponding to an age bracket of 35 to 45 years old. The account activity section 18(C) of the transaction activity database 18 uses each customer's account types or account activity, or both, to calculate which decile level the customer should receive.

In addition to providing a ranking system, the system includes a method of distributing incentives to the customers via the financial institution's existing network of Automated-Teller-Machines (ATM) 30, teller workstations 31, monthly account statements 32, customer service representatives (CSR) 33, direct mailings 34, call center home banking 35 and PC/Internet home banking 36. The decile discount distribution module 20 controls the distribution of incentives via the network 12.

V. System Diagram

The decile discount distribution module 20 controls the decision making process of correlating a decile reward level with each customer based upon account type, account activity or other such criteria, as shown in FIG. 1A. The decile discount distribution decision model 21, shown in FIG. 2, controls the relationships between the incentives, the ranking of a customer's transaction activity in the decile system and the monitoring of the customer's transaction activity in real time. The discount/incentive database 22 stores the incentives received from the manufacturers, distributors, dealerships, and retailers. Thereafter, the incentives are stored in the specific decile levels within the decile discount database 23. As set forth above, these decile levels are used by the financial institution to determine which incentives are to be distributed to a customer based upon the customer's transaction activity, customer demographics or other account data. In another embodiment, the system manager 202 uses the decile system set forth above to determine which incentives should be distributed to a customer using decile levels. The transaction decile ranking database 24 interacts with the financial institution's customer application database 25 to correlate each customer's transaction type and transaction activity with the decile levels established in the decile discount database 23. The system modules that control each customer's transaction type 26, transaction activity 27, and transaction variations 28 are logically related to the customer application database 25 through the virtual database query module 29. The transaction variation module 28 measures the transaction activity in real time and adjusts the decile levels based upon a predetermined transaction variation range. The virtual database query module 29 retrieves the customer transaction activity information from the financial institution customer database in order to determine a customer's decile level. Virtual Database Query modules 29 may be the report generation, or data warehousing and data mining system provided by a system manager 202 or a similar module stored on the central computer system used by the financial institution.

Figure 3A:
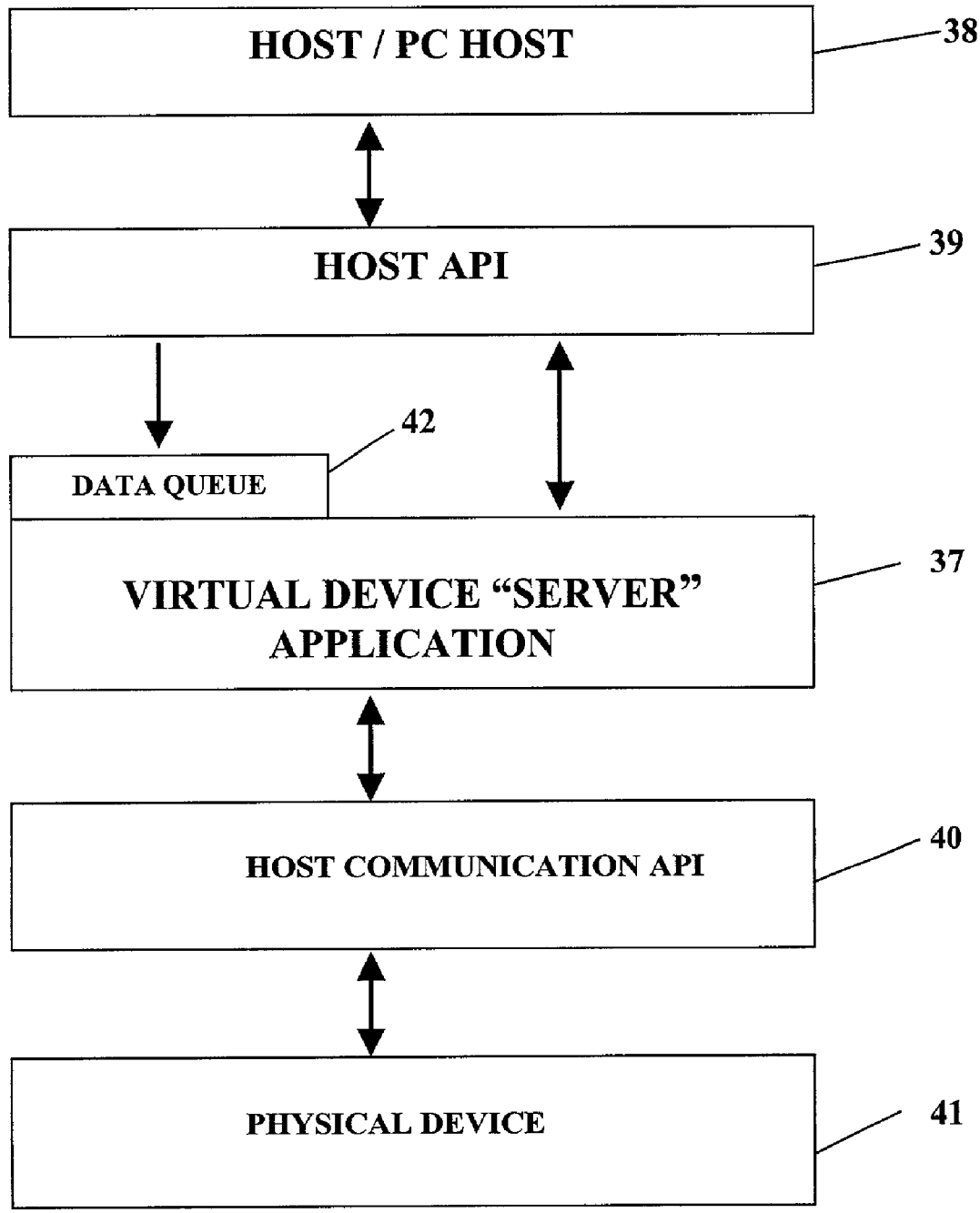
FIG. 3A shows a block diagram of the components of the decile discount distribution system.

The decile discount distribution module 20 of FIG. 1 includes the computer components depicted in FIG. 3A. Specifically, the decile discount distribution module 20 includes a virtual device "Server" application (VDS) 37 that receives commands and data from a host or PC-host 38, host application-program-interface (API) 39, or communication API 40. The VDS application 37 provides the necessary data conversion for the physical devices 41 used by a financial institution's customers. The VDS application 37 interfaces with various computer architectures supported by the financial services industry. Further, the VDS application 37 structure is a virtual system which enables the VDS application 37 to control and manage each special protocol session required by the physical devices 41 in order to distribute the incentives. When a session begins with a physical device 41, the VDS application 37 downloads all required configuration parameter files before opening a session. User-defined configuration parameter files are reformatted by the application and transmitted to the physical device 41. Asynchronous events are handled by the VDS application 37 using the data queue 42 entries.

Figure 2:
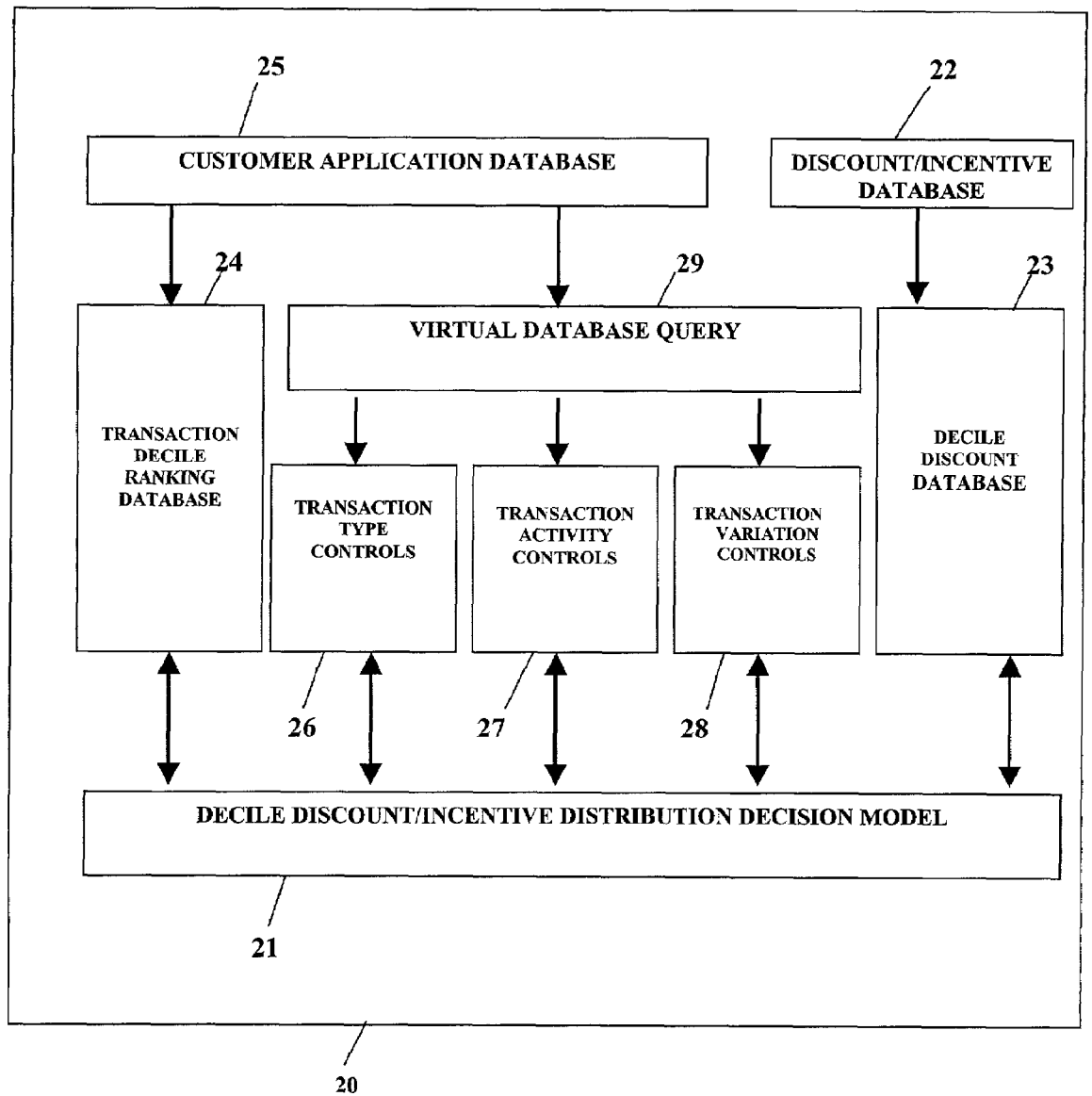
FIG. 2 is a block diagram of the decile discount distribution decision model.

The VDS application 37 monitors the activity generated by each peripheral or sub-system within the financial institution network. Once a customer has been identified as communicating with the financial institution, the VDS application 37 searches the transaction decile ranking database 24, as shown in FIG. 2, in order to determine the discount category for the customer using the decile discount distribution decision model 21 of FIG. 2. The decile discount distribution module 20 interprets the transaction activity parameters and measures a customer's incentive decile level. After determining the decile level, the VDS application 37 interrogates the decile discount database 23 to determine the group of incentives corresponding to the decile level. The system then maps the incentives to the physical device 41 and to the network being used by the customer. Alternatively, the functions depicted in FIG. 3A could be completed by a system manager 202.

VI. Incentives List

The incentives list 200 may include a single incentive or a plurality of incentives depending on the form of delivery which may include, but is not limited to, using an ATM 30, a bank teller 31, monthly banking statements 32, a customer service representative 33, direct mail 34, a telephone 35, or a PC/Internet 36. The incentive distribution system is capable of distributing incentives in the form of a journal printer receipt format, as shown in FIG. 3B. The incentives list 200 is used to inform a customer of the incentives being offered to that particular customer. The incentives list 200 is an efficient tool for distributing multiple incentives to customers in a bundled, concise and manageable fashion. This method of communicating incentives to consumers reduces waste normally associated with traditional coupon discount methods such as free standing inserts, in-store coupon dispensers, or coupon kiosks. An incentives list 200 is presented to each customer in a receipt format that allows the customer to immediately understand the incentives offered by each participating manufacturer, distributor, dealership, and retailer. The format of the incentives list 200 may be modified based upon the specific peripheral or system being used by a financial institution customer. Each incentives list 200 generated by the financial institution computer network may also include a disclaimer such as "the value of the discount list is not more than 1/64 of one cent" or other similar statement in order to comply with all applicable law.

The specific peripheral or system used by each customer will determine the presentation of each customer's incentives list 200. For instance, a receipt generated by one brand and model of ATM may differ from a receipt generated by another model of ATM. Further, an incentives list 200 included within a monthly bank statement may differ from the list generated by an ATM. Thus, the incentives list 200 disclosed is format independent.

The incentive distribution system is also capable of generating bar coded manufacturer product discount coupons. This bar coded discount incentive coupon method may be generated using current ATM and Laser Printer technology or any method of printing or producing tangible coupons. For instance, ATMs manufactured by Diebold, NCR, Fujitsu/ICL, Triton Systems, Tidel Engineering, and Siemens-Pyramid are capable of generating and distributing CPG manufacturer coupons. These current systems are designed as stand-alone modules and have no interconnection with the financial institution's computer system or each financial institution's customer database for determining manufacturers' product discounts or incentive rewards. However, each is capable of distributing the incentives list to a customer using the ATM.

VII. Redemption

The systems of the present invention can be used to track and to control the redemption process. Specifically, the redemption of incentives can be tracked and controlled through a participating retailer and dealership network. Additionally, the incentive distribution system is capable of tracking the redemption process via the computer network used by retailers and dealerships in order to automate the purchased products redemption cycle. Further, the incentive distribution system controls the communication of incentives that have been redeemed at a retailer or dealership between the entity validating the incentive to the customer and the entity offering the incentive. These redemptions are then communicated to the financial institution's network.

Each retailer or distributor participating in the financial institution's network is directly integrated into the financial institution network as shown in FIG. 1A. Each retailer's in-store point-of-sale (POS) computer system 43 and each dealership's order processing computer system 44 are directly connected to the financial institution's product discount reward network.

Figure 4A:
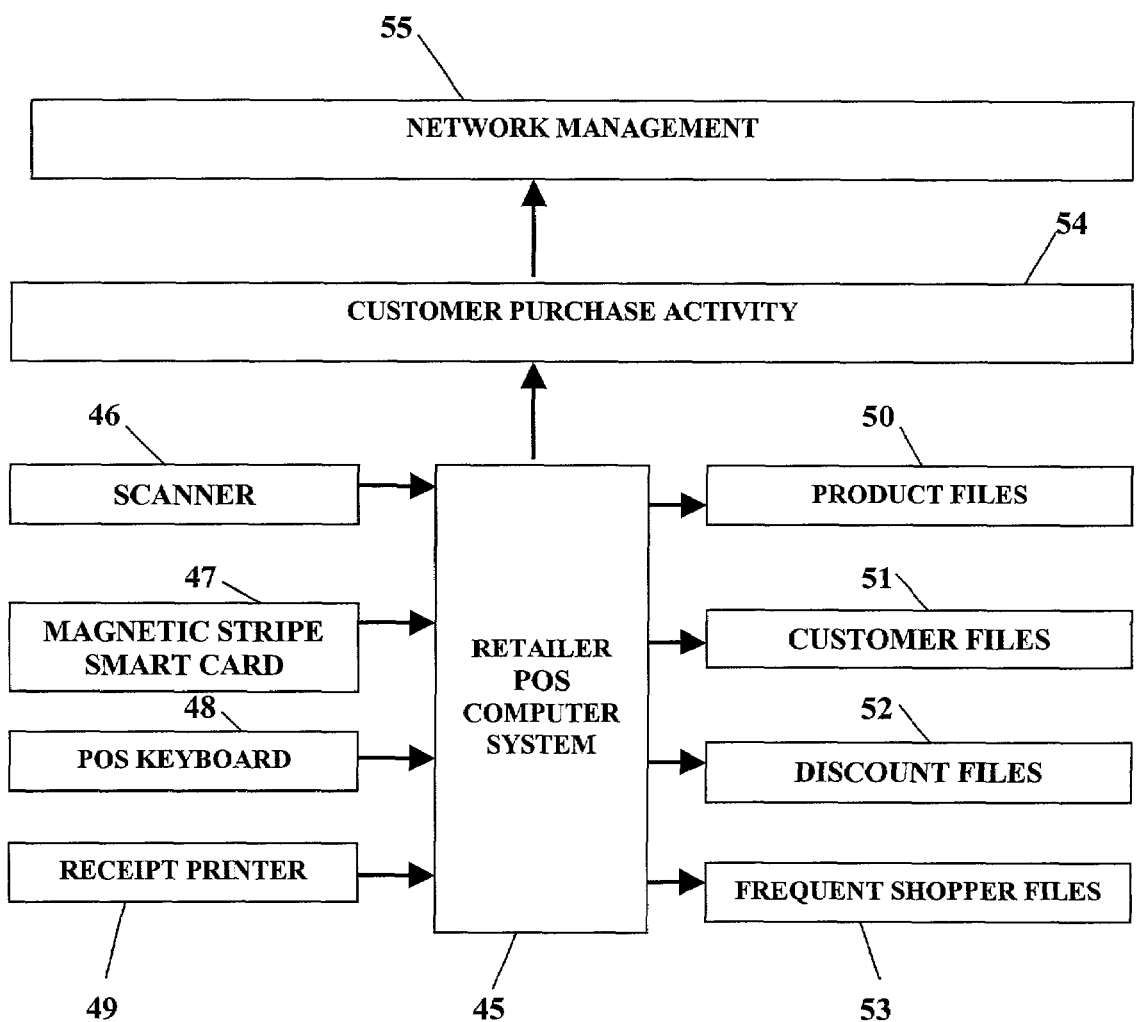
FIG. 4A shows the components of a retailer's POS computer system that is used to control and track the purchasing history of customers.

FIG. 4A shows the components of the retailers POS computer system 45 used to control and track each individual customer's purchasing history. The POS computer system 45 controls, in real time, the processing of the manufacturer's coupon redemption, the processing of a frequent shopper membership card program, and the generation of the customer's purchase receipts through the peripherals attached to the POS computer system 45 which includes, but is not limited to, bar-code scanners 46, magnetic stripe readers 47A, smart card readers 47B, POS data entry keyboards 48, and receipt printers 49. These peripherals interact with data files, including product files 50, customer files 51, discount files 52, and frequent shopper files 53, which are used to track and control a customer's purchasing activity through a POS computer system 45. Products which are purchased are tracked with a standard bar code Universal Product Code (UPC) specification. The UPC specification convention is integrated into the retailer's POS scanner 46, magnetic stripe or smart card 47 peripheral devices. Alternatively, each purchase could be tracked through the use of a product tracking system other then the UPC system. The customer may be identified using the method of payment for the item being purchased, credit card information, membership card information, smart card information, debit card information or other sources of information identifying the customer. Once the customer is identified by the POS computer system 45, all products purchased, and discounts received, by that customer are stored in a frequent shopper file 53 associated with that customer. This frequent shopper file 53 becomes part of the frequent shopper history customer database. At the conclusion of the checkout process each customer receives a store receipt 49 identifying the discounts and frequent shopper bonus points received.

The customer purchase activity module 54 stores the purchasing activity of each customer. The network management module 55 communicates the purchasing activity of each retail customer to the financial institution. Each customer participating in the incentive distribution system is assigned a unique identification code that is used to track the customer's financial activity. This customer identification code is used by the financial institution to provide security and privacy, and to maintain anonymity for each customer. The customer purchasing activity module 54 controls the comparison of a retailer's customer to the customer's identification code. When the customer has been identified as using a participating retailer's POS, a product transaction log is compiled that shows a customer ID, manufacturer ID, a UPC product code, and the date of purchase. This product transaction log is immediately transmitted by the network management module 55 to the financial institution.

Figure 4B:
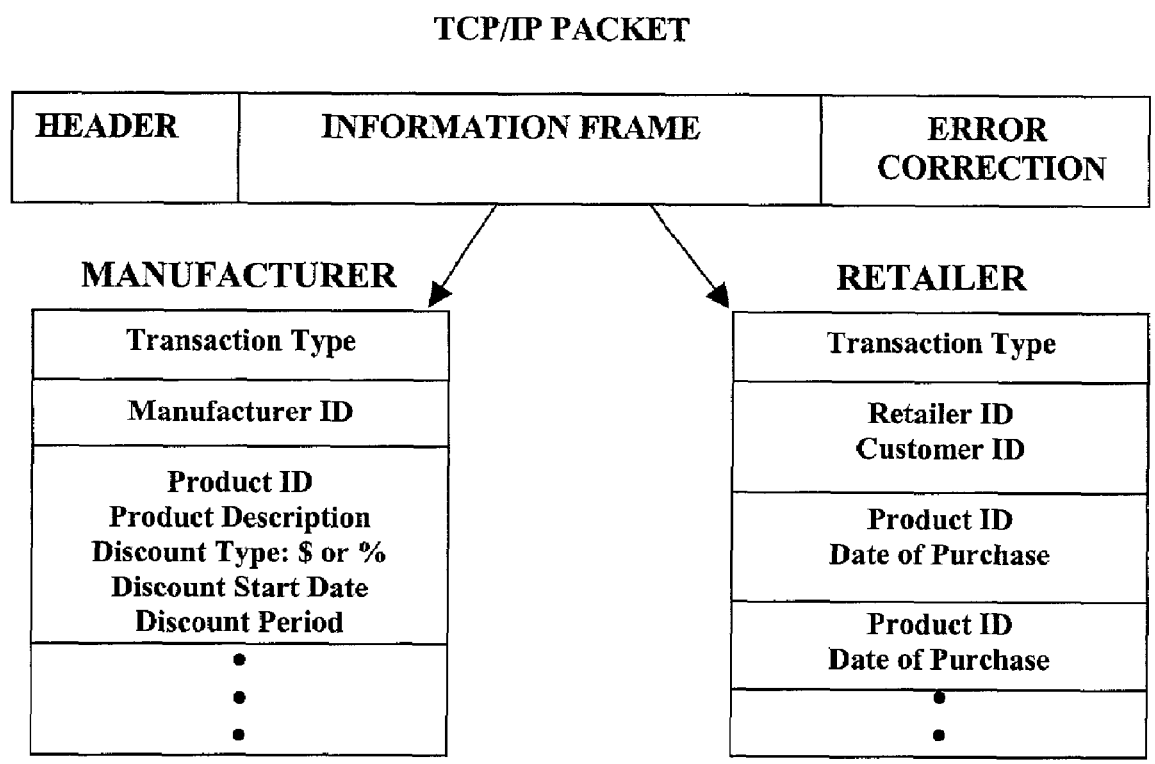
FIG. 4B shows an example of a transaction log for a manufacturer and a retailer.

Examples of these transaction logs are shown in FIG. 4B, which includes both retailer and dealership transaction formats. Further, the formats depicted in FIG. 4B are used by participating manufacturers and distributors in the incentive distribution system to communicate the product discount files for the manufacturer 8 and distributor 9, as shown in FIG. 1A. Each type of transaction is packaged in a standard TCP/IP format or other similar format. The transactions conducted with the manufacturers, distributors, dealerships, and retailers become part of the information frame portion of the TCP/IP packet. Thus, the financial institution's computer database and network is an integral part of the manufacturers' and distributors' data warehouse and decision-support system.

Figure 5:
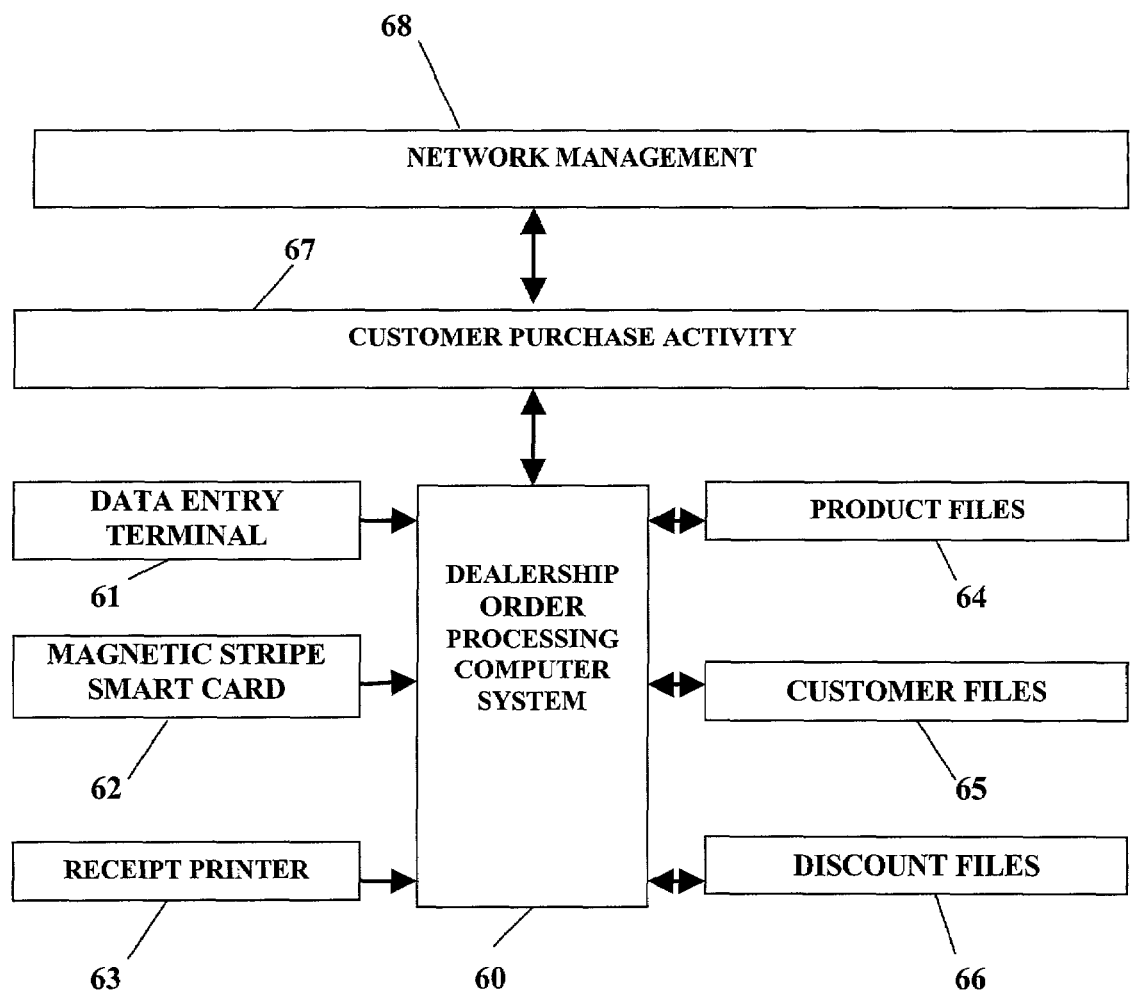
FIG. 5 shows the components of the incentive distribution system which controls and tracks transactions made at a dealership.

FIG. 5 shows the components of the incentive distribution system used to control the product discounts used at a dealership. A dealership may include a seller of consumer goods, including, but not limited to, automobiles, airplanes, motorcycles or boats, appliance stores, electronics stores, computer stores or other similar avenue of commerce. A dealership order processing computer system 60 tracks and controls the product discount redemption related to the incentive distribution system. Customer purchases are recorded using a series of peripherals including a data entry terminal 61 and a magnetic stripe or smart card reader 62, which are attached to the order processing computer system 60 for handling both verbal and credit card transactions. A receipt printer 63 produces receipts listing the products purchased and discounts received. Files including, product files 64, customer files 65 and discount files 66 are used to track the purchasing history of each customer's transactions and are controlled by the order entry processing system 60. Similar to the retailer components shown in FIG. 4, the customer purchasing activity module 67 and network management module 68 control the tracking and communication of the product purchased at each dealership.

The system records which incentives are distributed to each customer of the financial institution. Additionally, the system stores all transactions made by a customer with a participating retailer or dealer. These files may be stored in numerous places including, but not limited to the system manager's databases or the financial institution databases. The system is capable of generating numerous reports for manufacturers and distributors analyzing the productivity of the incentives offered. Alternatively, the functions depicted in FIGS. 4A and 5 could be controlled by a system manager 202 communicating with the POS system or a POS device. A typical POS device could be the Credit Card Terminal located at the POS station. Through use of the financial institution's debit card, a system manager 202 could identify and verify incentives of the financial institution's customers at the POS station.

The incentive distribution system uses transactions made with ATM, debit, credit, or smart card technologies to identify and track customer movement between the financial institution, retailers, and dealerships. These financial institution cards provide an alternative to the retailer issued frequent shopper membership card. The customer purchasing activity module 54 intercepts electronic transactions in order to process a customer transaction log. The system interfaces with the national and regional networks of Master Card, Cirrus, Visa Plus, The Exchange, NYCE, MAC, Tyme and other similar systems though use of ATM, debit cards, credit cards, and smart cards in order to monitor the transactions from each participating retailer or dealership in the incentive distribution system. In order to track customers utilizing the card technologies listed above, the incentive distribution system provides identification codes for each customer of a financial institution in the incentive distribution system and supplies these codes to each card supplier used by the retailer or dealership network. This identification code may use a standard industry format including a customer ID, a customer name and a customer personal identification number (PIN).

VIII. Clearinghouse

The systems also preferably act as clearinghouses. A financial institution may use the incentive distribution system in order to act as a clearinghouse for redeeming the incentives. Specifically, a financial institution may use the electronic funds transfer (EFT) network 58 and the network redemption invoicing module 57 to debit and credit the financial accounts held by each participating retailer, dealership, manufacturer and distributor. For instance, a financial institution may use the Automated-Clearing-House network (ACH) or other electronic funds transfer network, such as an electronic commerce network an electronic data interchange of the Internet, to process the redemptions.

Figure 17:
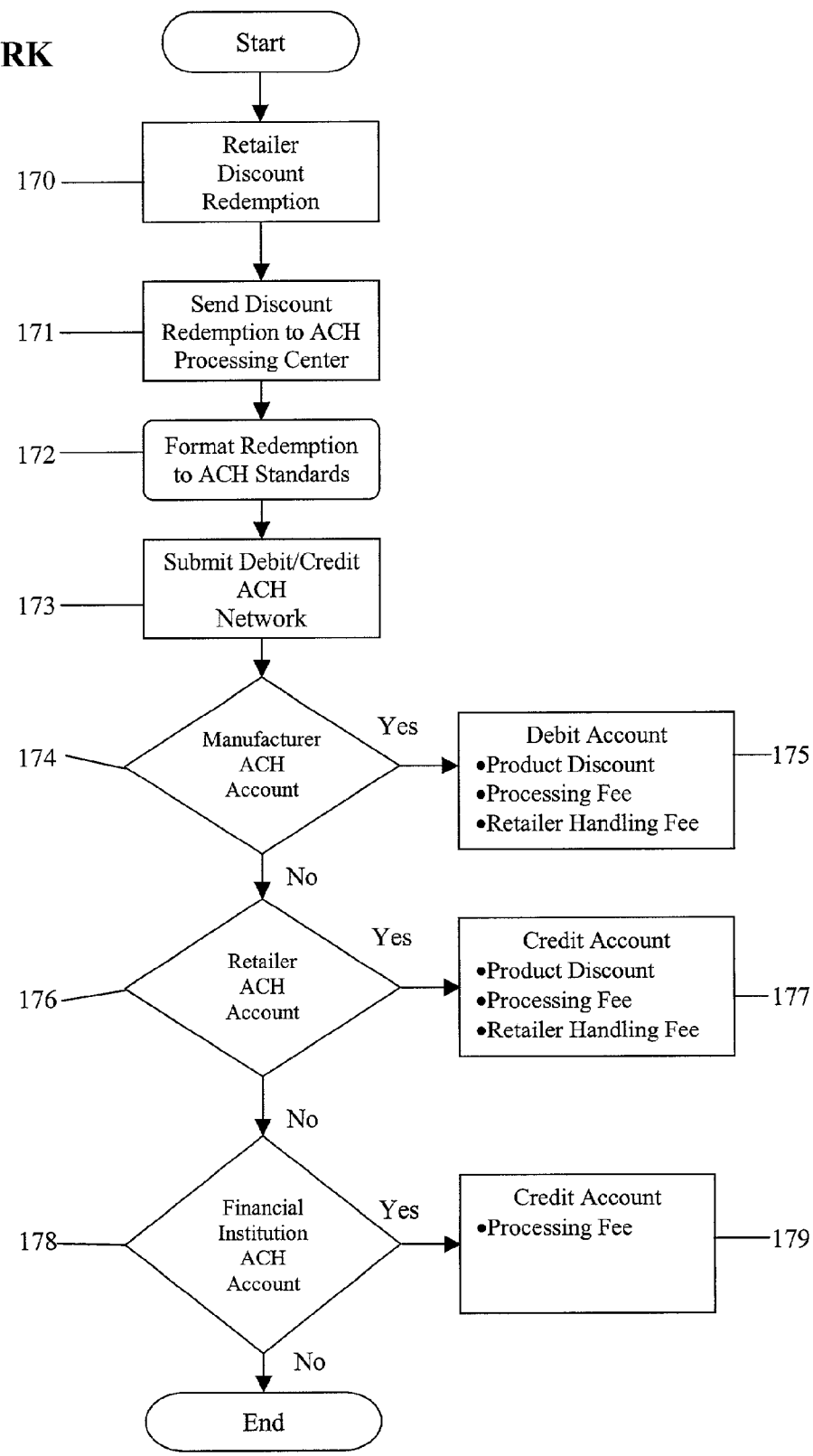
FIG. 17 is a flow chart of an Automated Clearing House (ACH) processing manufacturers' product discounts and incentives.

The Automated Clearing House (ACH), as shown in a flow diagram in FIG. 17, is a government regulated system and network for processing manufacturers' product discounts and incentives. The ACH network is capable of processing payment of a manufacturers' product discounts and is capable of processing fees associated with the network of participating retailers and dealerships. Using the ACH network greatly reduces time requirements, increases accuracy, reduces costs and deceases fraud associated with traditional clearinghouse methods.

After a product discount is redeemed 170, the discount information is sent to a financial institution's or third party's ACH processing center 171. Preferably, the discount transaction is formatted 172 in an ACH standard defined by the National Automated Clearing House Association (NACHA) prior to being transmitted over the ACH network. Presently, NACHA is the governing group that controls the rules and regulations for ACH processing. However, in an alternative embodiment, the discount transaction may be formatted in an ACH standard at any time prior to being processed by the ACH. Furthermore, the transaction may be formatted into any form used and required by the ACH.

After formatting, the ACH transaction is submitted to the network used to electronically debit and credit accounts 173. Each ACH transaction is sent through a secure wire to the Federal Reserve Bank (FRB). The FRB records who initiated the payment transmission and which accounts are to receive payment. Each participating manufacturer establishes an ACH debit account 174 for distributing the discounts and fees to the participating financial institution, retailers and dealerships. Additionally, each financial institution 176, retailer and dealership 178 establishes an ACH credit account for receiving discount and fee distributions. Each product discount distribution, the processing fee for handling the product discount distribution 179, and the handling fee paid to the retailers are debited from a manufacturer's debit account 175 and paid to a retailers' 176 and financial institutions' 178 ACH credit account.

In operation, a financial institution receives a transaction log from the network 10 and compares the products contained within the product transaction log to the products listed in the decile discount database 15. Alternatively, the system manager 202 may receive the transaction log from the network 10. Each product discount match is recorded within network redemption invoicing module 57. At a predetermined time, the network redemption invoicing module 57 generates an electronic product redemption invoice in order to debit the manufacturer's and distributor's accounts. The financial institution collects the redemption and handling fees paid by the manufacturers and distributors. Alternatively, the system manager 202 may collect the redemption and handling fees. The rebates and fees collected may be electronically transferred between the manufacturers and financial organizations. The rebates, refunds and incentives may be credited to an account associated with a retailer recognizing an incentive with a customer, to an account associated with the financial institution, to an account associated with a network management company or with an account associated with a branded goods supplier recognizing the incentive with the customer. At the conclusion of the process, the financial institution measures the effectiveness of the reward program and generates a redemption productivity report. Alternatively, the system manager 202 may determine the effectiveness of the reward program. All redemption productivity reports are handled by the network redemption invoicing module 57.

IX. Example

Figure 6:
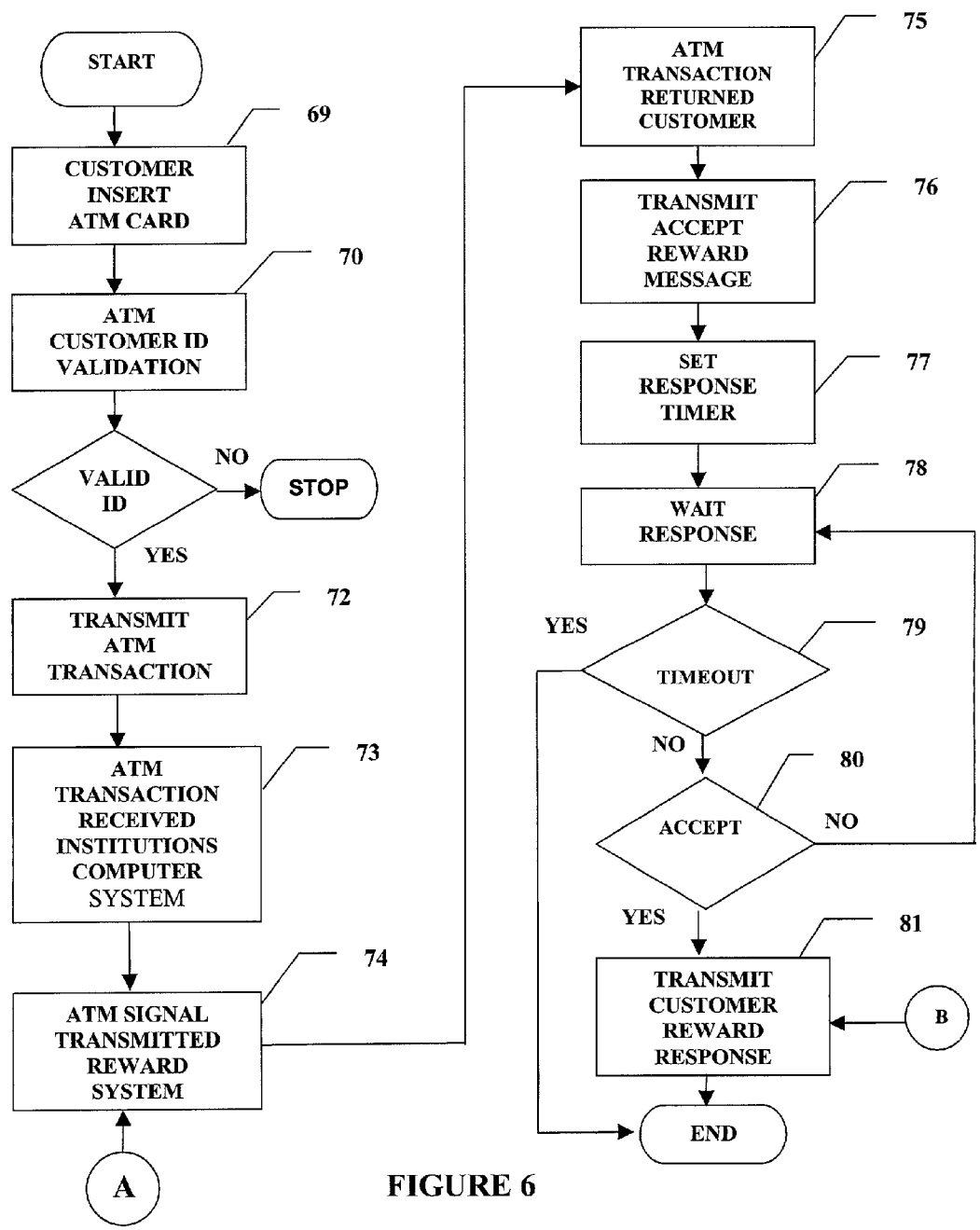
FIG. 6 is a flow chart detailing a method of distributing an incentives list to a customer via an automated teller machine.

The system distributes the incentives list 200 through means including, but not limited to, an ATM 30, a bank teller 31, monthly banking statements 32, a customer service representative 33, direct mail 34, a telephone 35, or a PC/Internet 36. For example, an ATM 30 may be used to distribute the incentives list 200, as shown in FIG. 6. A customer begins the transaction process by first inserting an ATM card into the ATM. Once the customer inserts an ATM card or other bank issued card into the ATM, the ATM validates 70 the customer ID number and password stored on the ATM card's magnetic stripe, on a microchip, or in the ATM's biometrics database. The ATM validates the customer by comparing the stored ID and password with the ID and password entered at the ATM machine by the customer. If the password is invalid, the customer is rejected and the transaction is terminated 71. If the password is valid, the ATM transaction is transmitted 72 to the financial institution's central computer system 73 for processing. When the transaction is received by the financial institution's central computer system 73, a signal 74 is immediately communicated to the VDS application 37. The VDS application 37, upon receipt of a signal from the ATM, generates an acceptance or rejection reward message 76, which is sent back to the customer's ATM location. This message is used to prompt the customer to decide whether to accept or to reject the incentives list 200.

The message requesting acceptance or rejection of the incentives list 200 is transmitted to the display screen after the ATM transaction has been processed. A response timer 77 is used within the reward system to cancel the offer if no response is received within a specific time period. If a customer ends the ATM transaction without sending a reject response, the system automatically cancels compiling the incentives list 200 when the period for response elapses 79. If an accept response 80 is received while waiting for a response 78, the incentive distribution system transmits the incentives list 200, as shown in FIG. 3B, to the customer's ATM location 81. On the other hand, if the customer is found ineligible during the compiling process, a message is transmitted to the ATM informing the customer of the ineligibility status and terminating the ATM transaction.

Figure 7:
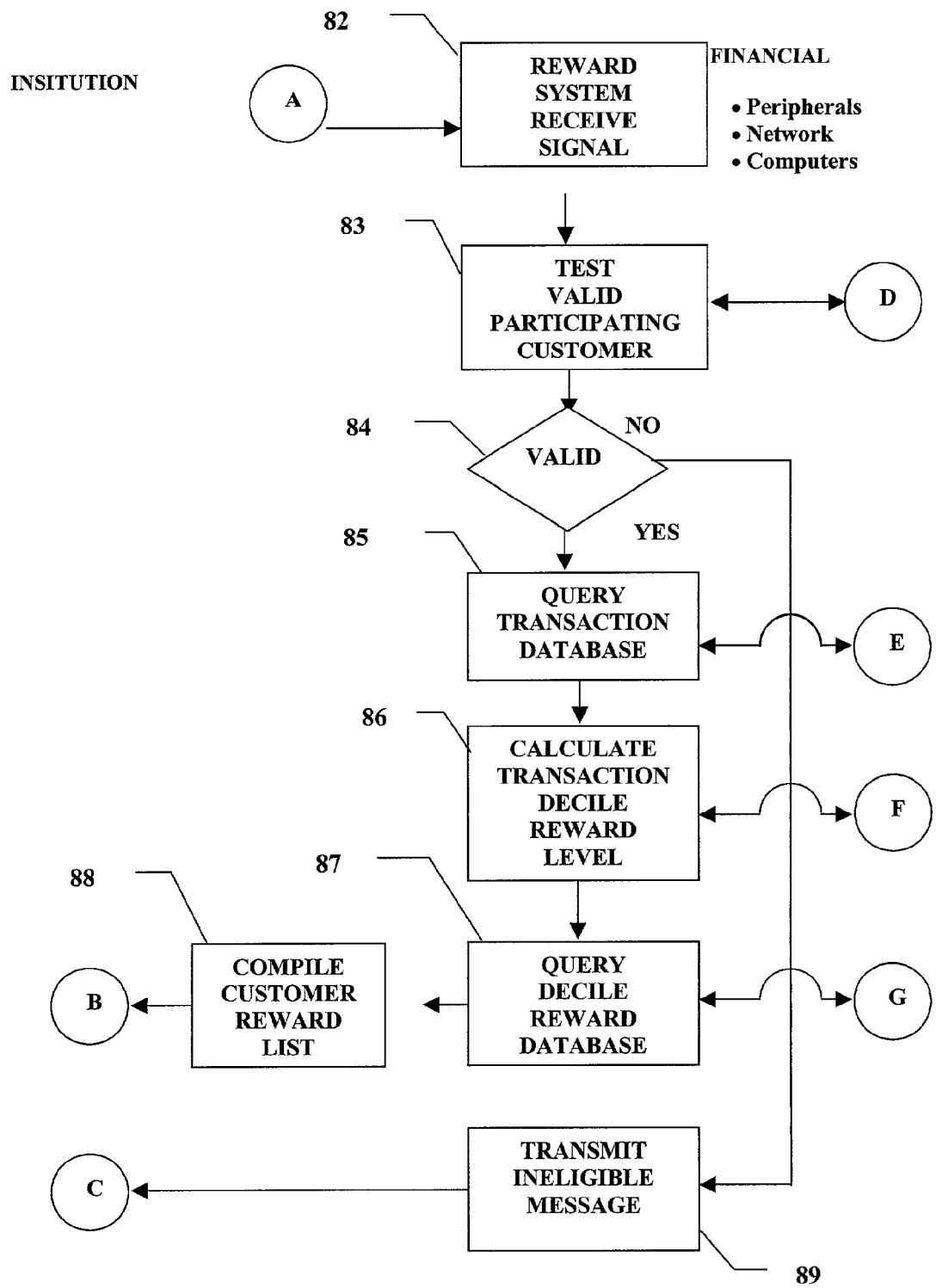
FIG. 7 is a block diagram detailing the incentive distribution system within a financial institution.
Figure 8:
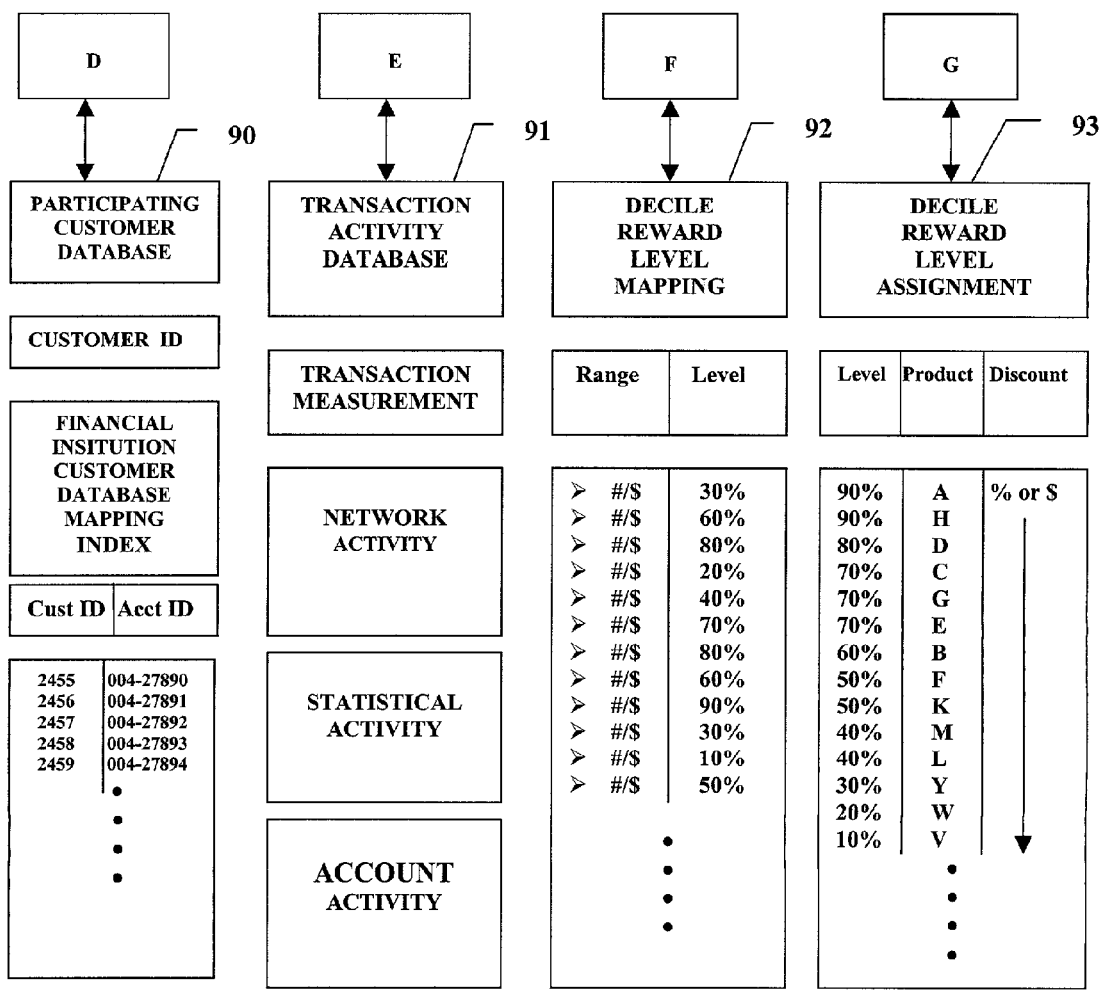
FIG. 8 is a block diagram showing the components of the reward database.

While the financial institution is processing a customer's ATM transaction, the VDS application 37 begins compiling the customer's incentives list 200, as shown in FIGS. 7 and 8. The customer database 90 is then searched for a participating customer match 83. If a match is detected 84, the system queries the transaction activity database 91 in order to obtain the customer's network activity, statistical activity and account activity profiles which are used to determine which incentives are to be distributed to the customer. As set forth above, each financial institution determines its ranking schema for rewarding their customers with incentives. Alternatively, the manufacturers and distributors could make this decision.

After the transaction database has been queried for the necessary information 85, the system calculates and assembles 86 the incentives list in the following manner. Each customer's transaction levels are mapped to the decile reward level assignment 93. The system interrogates the decile mapping database 92 in order to establish which decile reward level the customer is eligible to receive 87. Once the decile level has been established, the system 87 retrieves the incentives from the decile level assignment 93 database. After completing the calculation phase, the customer's incentives are compiled 88 and transmitted 81, as shown in FIG. 6, to the customer's ATM location. If the customer is ineligible 84 to receive an incentives list 200, a message stating the ineligibility is transmitted 89.

Figure 9:
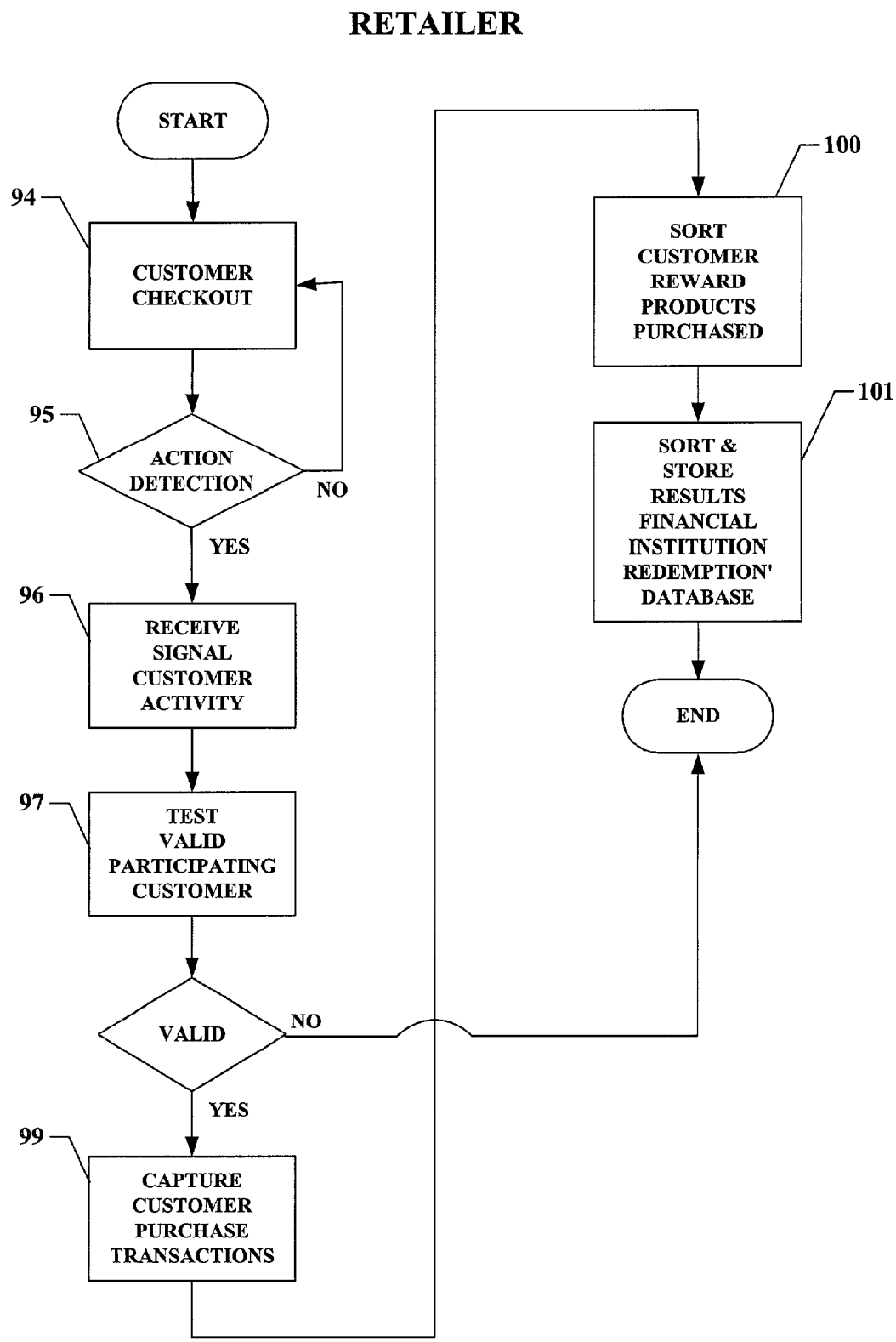
FIG. 9 is a flow chart detailing a transaction occurring at a retailer.

FIG. 9 details a method of tracking purchases made by customers of a financial institution in conjunction with the incentives program. After a customer has received the incentives list 200, the customer begins the checkout process 94. When a customer is detected by the incentive distribution system, a signal 96 alerts the customer purchase activity module 54, FIG. 4A, or 67 FIG. 5, to search the financial institution customer database 1 for a valid match 97. If a valid match is found, the customer purchase activity module captures all the items processed by the POS or the order processing computer system for each customer 99. The customer purchase activity module 54 sorts all of the transactions and retrieves the transactions that are part of the financial institution's incentive distribution system 100. The incentives that are identified as part of the incentive distribution system are stored in the financial institution redemption database 101. The remaining products offered, but not redeemed, are captured.

Figure 10:
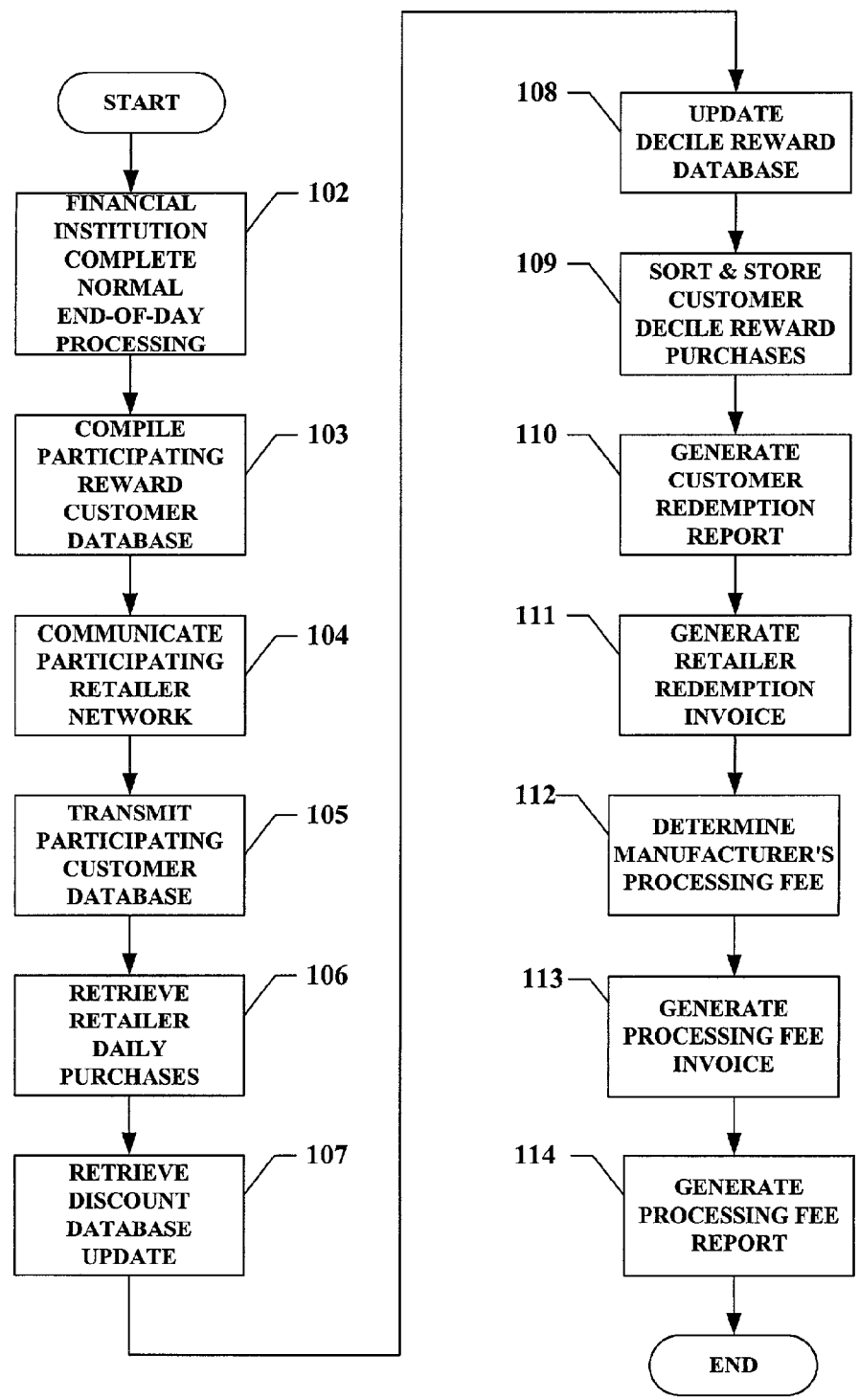
FIG. 10 is a flow chart detailing a financial institution's method of processing redemptions.

As described above and shown in FIG. 10, the incentive distribution system acts as a redemption clearinghouse by crediting and debiting the accounts held by participants. After the financial institution completes the end-of-day processing 102, the decile discount distribution module 20, shown in FIG. 1, compiles 103 an updated version of the encrypted customer database to be distributed to the retailer and dealership network 104. The network management module 11 then transmits the updated database to the retailer and dealership networks 105. During the same transmission period, the financial institution retrieves the daily incentive purchases from its databases for the retailer and dealership network 106. Next, the incentive distribution system retrieves 107 and updates 108 the incentives to be offered to the customers by the financial institution.

Once the customer purchases are stored 109, the system begins a reporting cycle. The incentive distribution system generates a redemption report that details the redemptions received the previous day 110. When the redemption report is completed 111, the incentive distribution system generates an invoice for each manufacturer. These invoices may be sent to the manufacturers via the ACH or an equivalent network. The final stage of the exchange process is to determine the processing fee 112 due from the manufacturers paying for the redemption. Once the processing has been determined, an invoice is generated 113 and sent to the manufacturer and a report is generated 114. Preferably, the handling fee invoices are generated on a monthly basis.

X. Distribution

Figure 11:
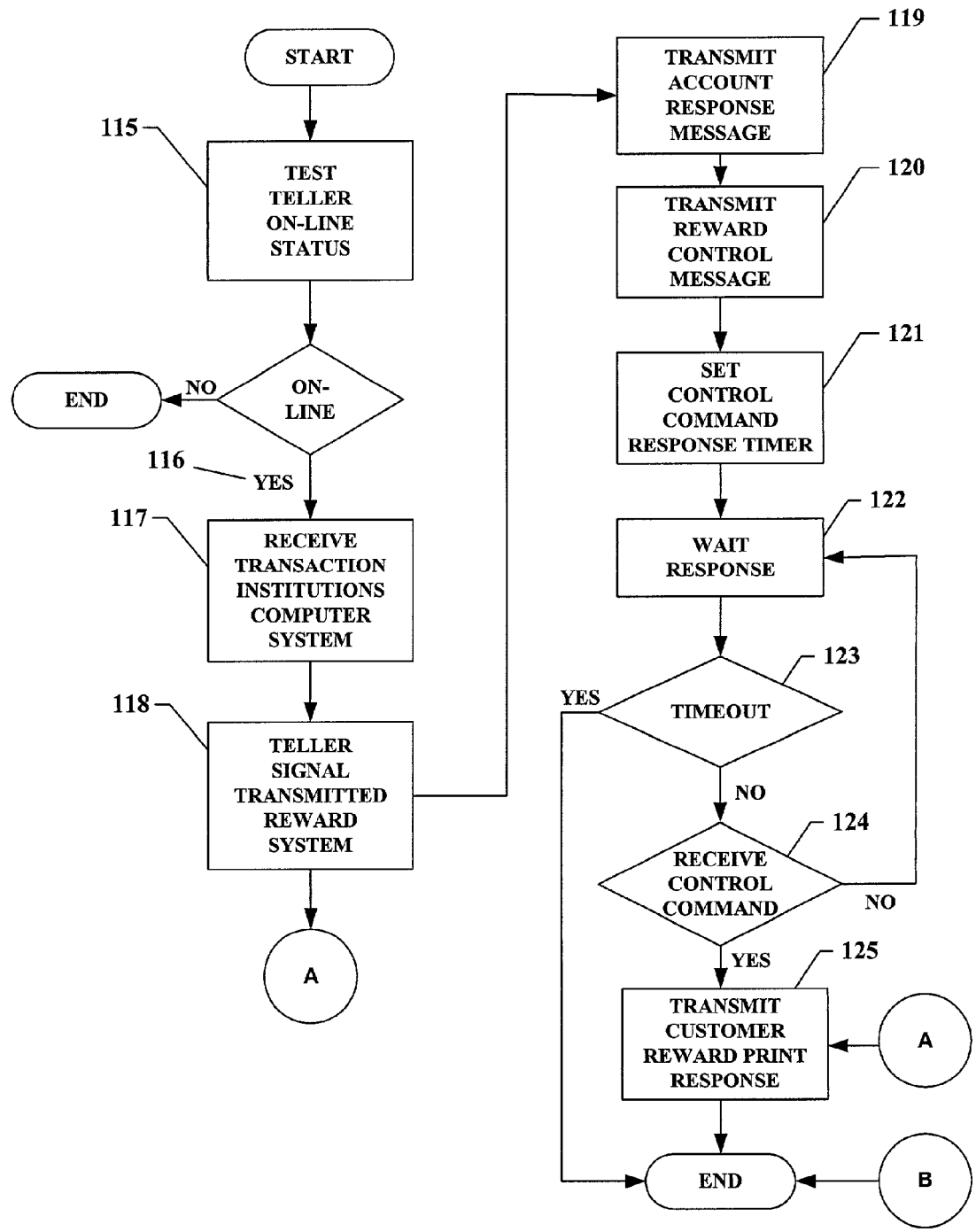
FIG. 11 is a flow chart detailing a method of distributing an incentives list to a customer via a teller workstation.

As shown in FIG. 11, a financial institution may distribute an incentives list 200 to a customer through one of its teller workstations. In order to receive an incentives list 200 from the decile discount distribution module 20, as shown in FIG. 1A, the teller workstation should be communicating on-line to a financial institution's central computer system 115. If operating on-line 116, each transaction processed by the teller is transmitted to the bank central computer system. When the teller transaction is received by the central computer 117, a signal 118 is transmitted to the VDS application 37, as shown in FIG. 1A. The VDS application 37 compiles the incentives list 200 as described previously and shown in FIGS. 7 and 8. After the financial institution's central computer system transmits a response 119 to the teller, an additional message prompting the customer to accept or reject the incentives list 200 is transmitted to the teller 120. This message informs the teller whether the customer being processed is eligible for an incentives list 200. If the customer is eligible, the teller solicits the customer to accept or reject the incentives list 200. A timer is set that limits the period for response. If the timer expires before receiving an answer, the period for acceptance of the offer is terminated 123. If an accept response is received prior to expiration of the timer, the VDS application 37 generates the incentives list 125.

Figure 12:
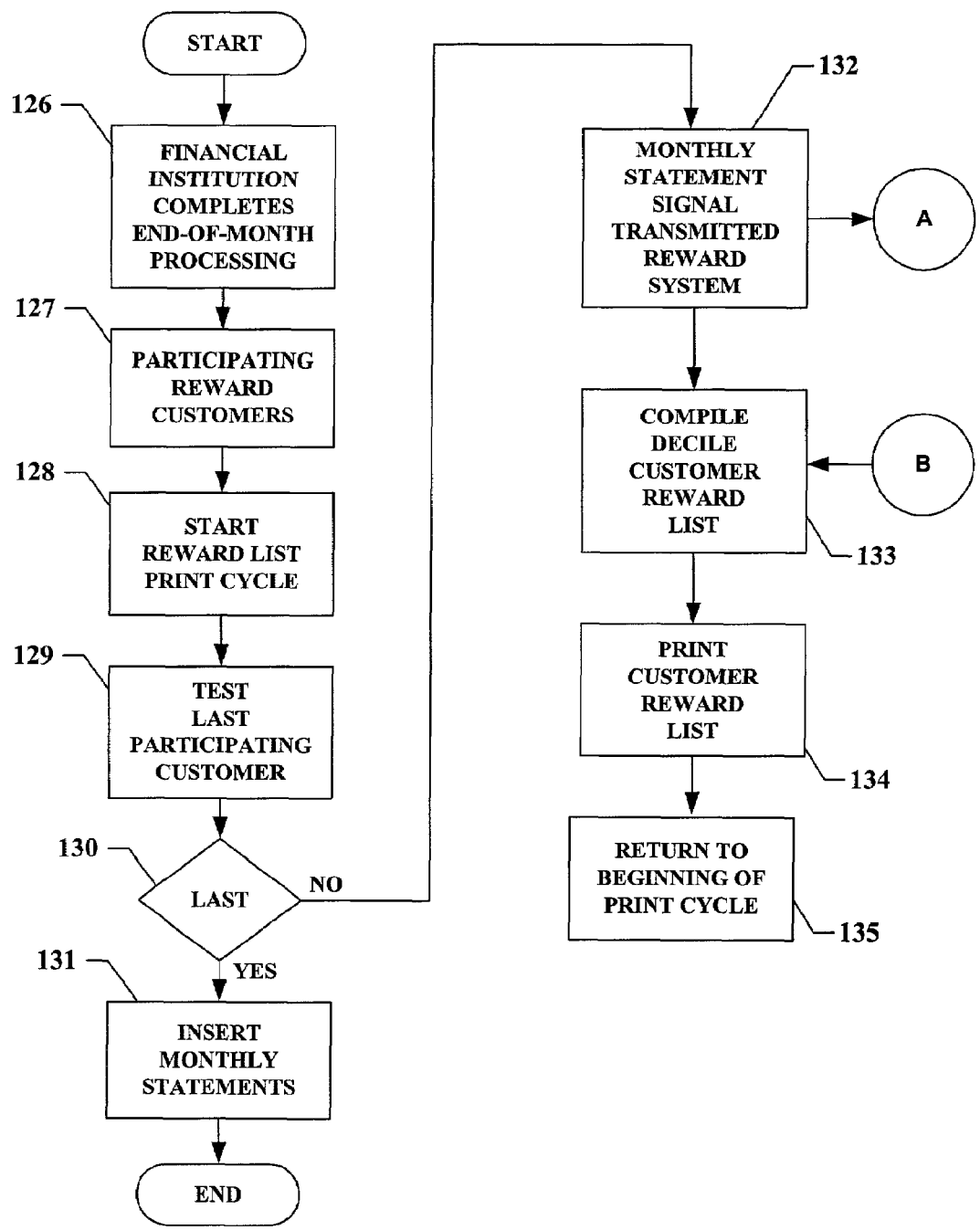
FIG. 12 is a flow chart detailing a method of distributing an incentives list to a customer via a monthly account statement.

FIG. 12 shows the process by which an incentives list 200 is distributed to a customer as part of the financial institution's monthly account statement. After a financial institution has completed end-of-month processing 126, a print cycle is started 128 for all participating reward customers 127. The incentive distribution system tests the last customer 130 that is to receive an incentives list 200 within the monthly statement in order to insure that the system is working properly. Upon completion of the test, the incentives lists 200 are inserted into each customer's monthly statement 131. At the beginning of the print cycle, a signal 132 is transmitted to the VDS application 37 for each customer participating in the program. After compiling an incentives list 200 for a customer, the incentives list 200 is printed 134. This cycle is repeated as necessary in order to print the desired number of incentive lists 200. Once the print cycle is completed for all customers in the database, the incentives lists 200 are inserted into the customers' monthly statements.

Figure 13:
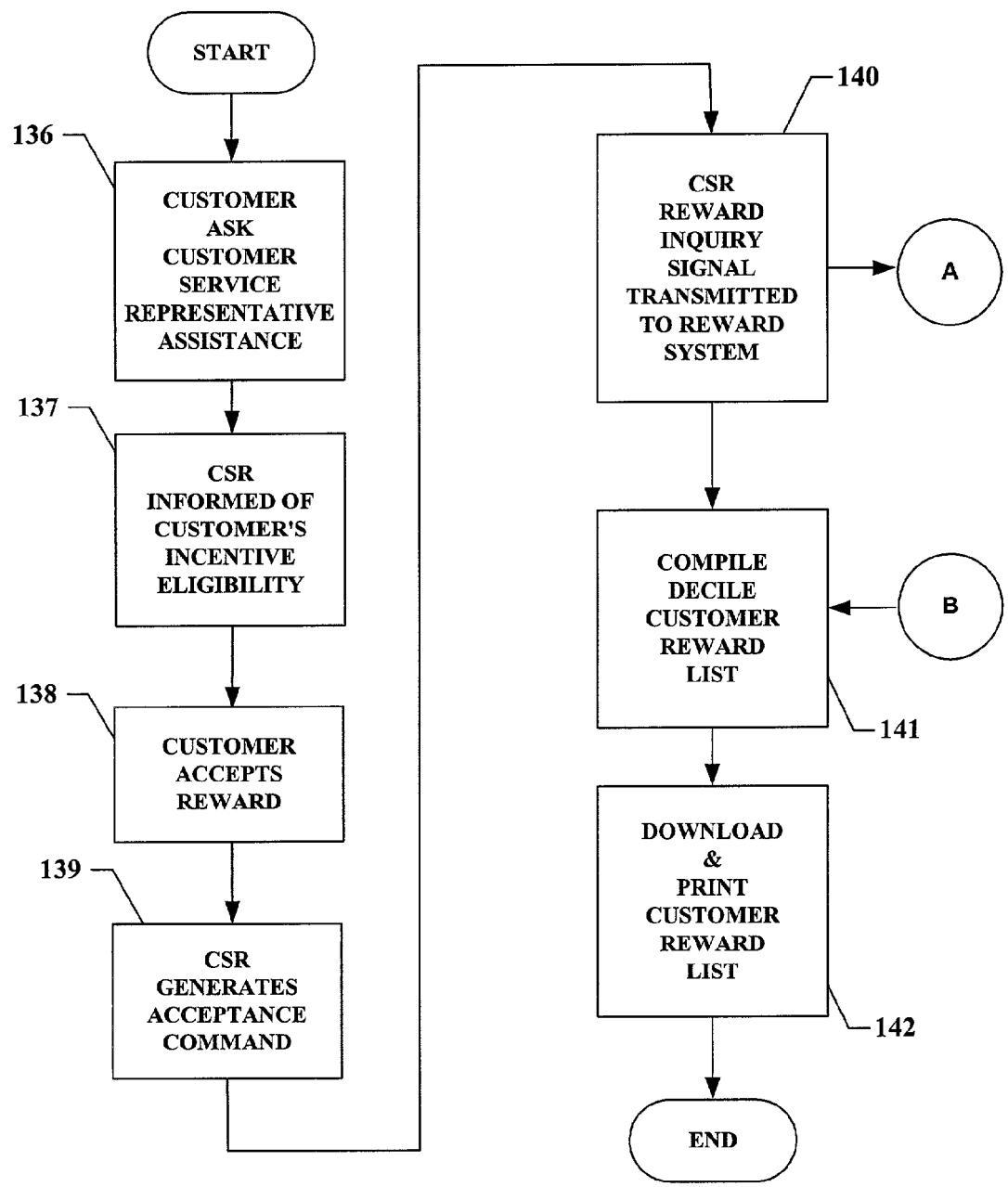
FIG. 13 is a flow chart detailing a method of distributing an incentives list to a customer via a customer service representative.

FIG. 13 depicts the method for distributing an incentives list 200 to a customer via a customer service representative (CSR). Typically, a customer initiates contact with a CSR 136. However, the CSR may initiate contact with the customer. Generally, the CSR is responsible for new accounts, loan inquiries, safe deposit box rentals, and other general bank product or service offerings. Preferably, each CSR has the ability to review a customer information file (CIF) including a data entry field showing the incentives for which each customer is eligible 137. Based upon each customer's eligibility, as shown within the data field, the CSR offers an incentives list 200 to the customer. If the customer accepts the reward offer 138, the CSR generates an acceptance command and sends it to the financial institution's central computer system 139. A signal 140 is immediately transmitted to the VDS application 37, requesting that an incentives list 200 be compiled. After the reward incentives list 200 is compiled 141, as shown in FIGS. 7 and 8, the list is downloaded and printed at the CSR's location 142. The incentives list 200 may be delivered to the customer in person in the office, via mail or electronic mail, or through any other means of communication between the financial institution and the bank.

Figure 14:
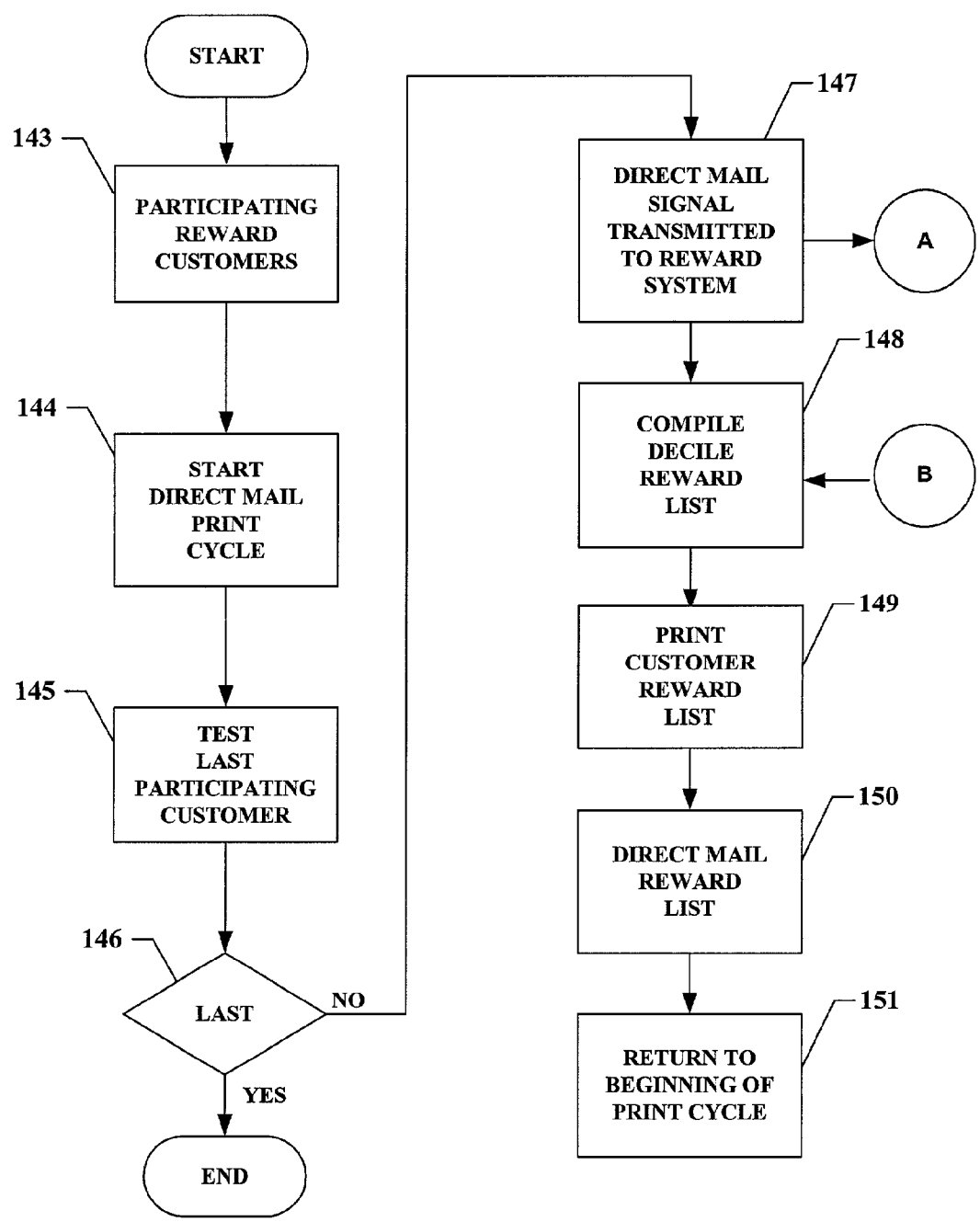
FIG. 14 is a flow chart detailing a method of distributing an incentives list to a customer via direct mail.

FIG. 14 depicts a method of distributing incentives lists 200 to customers via direct mail. A direct mail print cycle 144 is started for participating customers 143 in the customer database of the financial institution 1. A continuous test 145 is performed during the print cycle seeking the last participating customer 146. The print cycle runs until an incentives list is printed for the last customer on the list. When the test for the last customer is concluded, the incentives lists 200 are mailed to the customers. At the start of the direct mail cycle, a signal 147 is communicated to the VDS application 37, requesting it to compile an incentives list 200 for each participating customer 148. Once the incentives list 200 is compiled, the list is printed 149 and the print cycle begins again 150. Once the last customer has been processed, the incentives lists 200 are mailed 151 to the customers.

Figure 15:
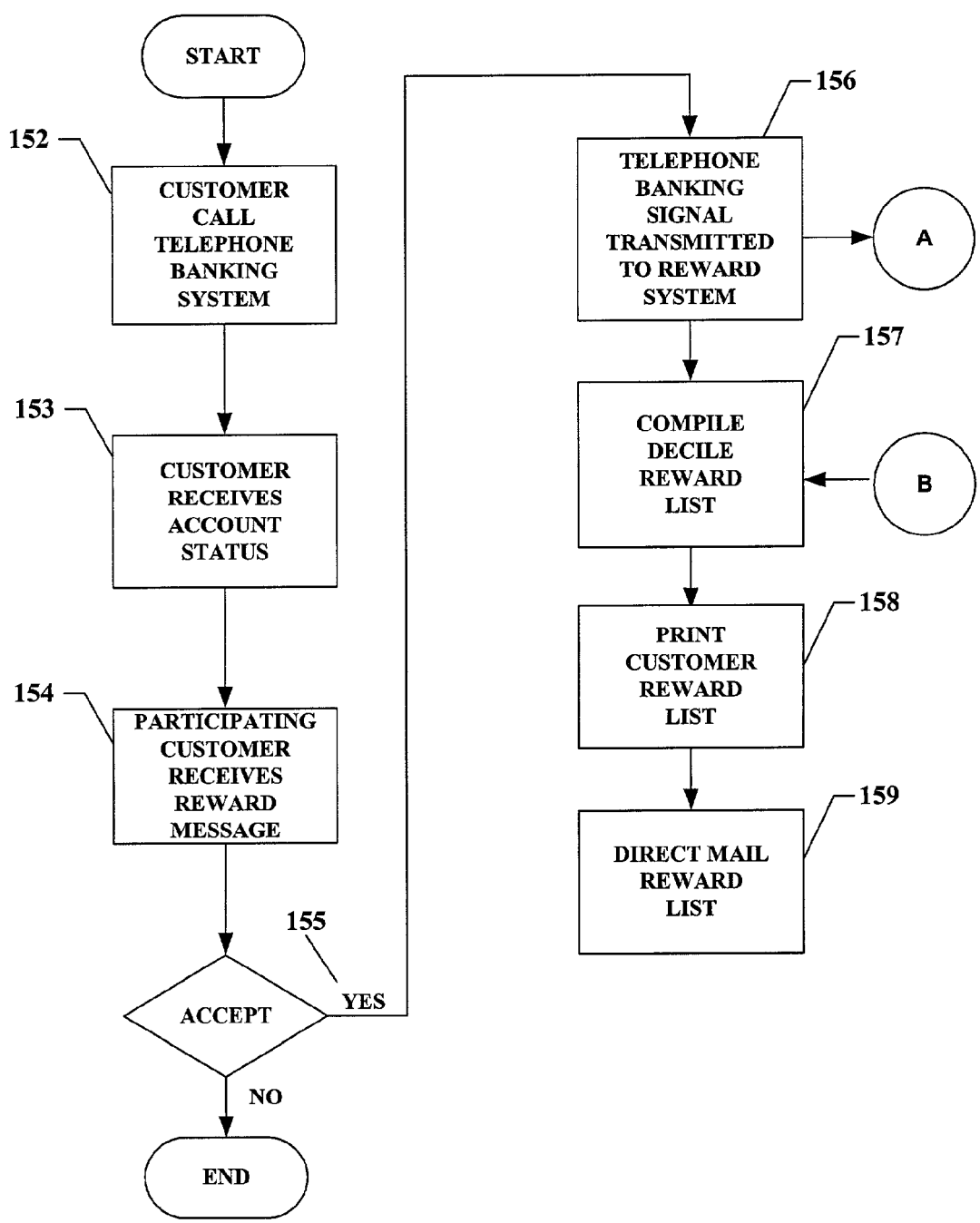
FIG. 15 is a flow chart detailing a method of distributing an incentives list to a customer via a telephone call or call center banking.

FIG. 15 shows a method of issuing incentives lists 200 through a financial institution's telephone home banking network, which includes, but is not limited to, an on-line network and a call center network. The method begins when a customer calls the telephone banking center 152. The telephone banking system prompts the customer to enter a valid account number and password. Once identified as a valid customer, the telephone banking system generates a voice script of the various account and product options available 153. Part of the voice script is a voice prompt 154 that informs the customer of their reward incentives list 200 eligibility. If accepted 155, a signal is communicated to the VDS application 37. When the signal is received 156, the system compiles 157 and prints 158 the incentives list 200. After the print cycle is completed the incentives list 200 is mailed to the customer 159.

Figure 16:
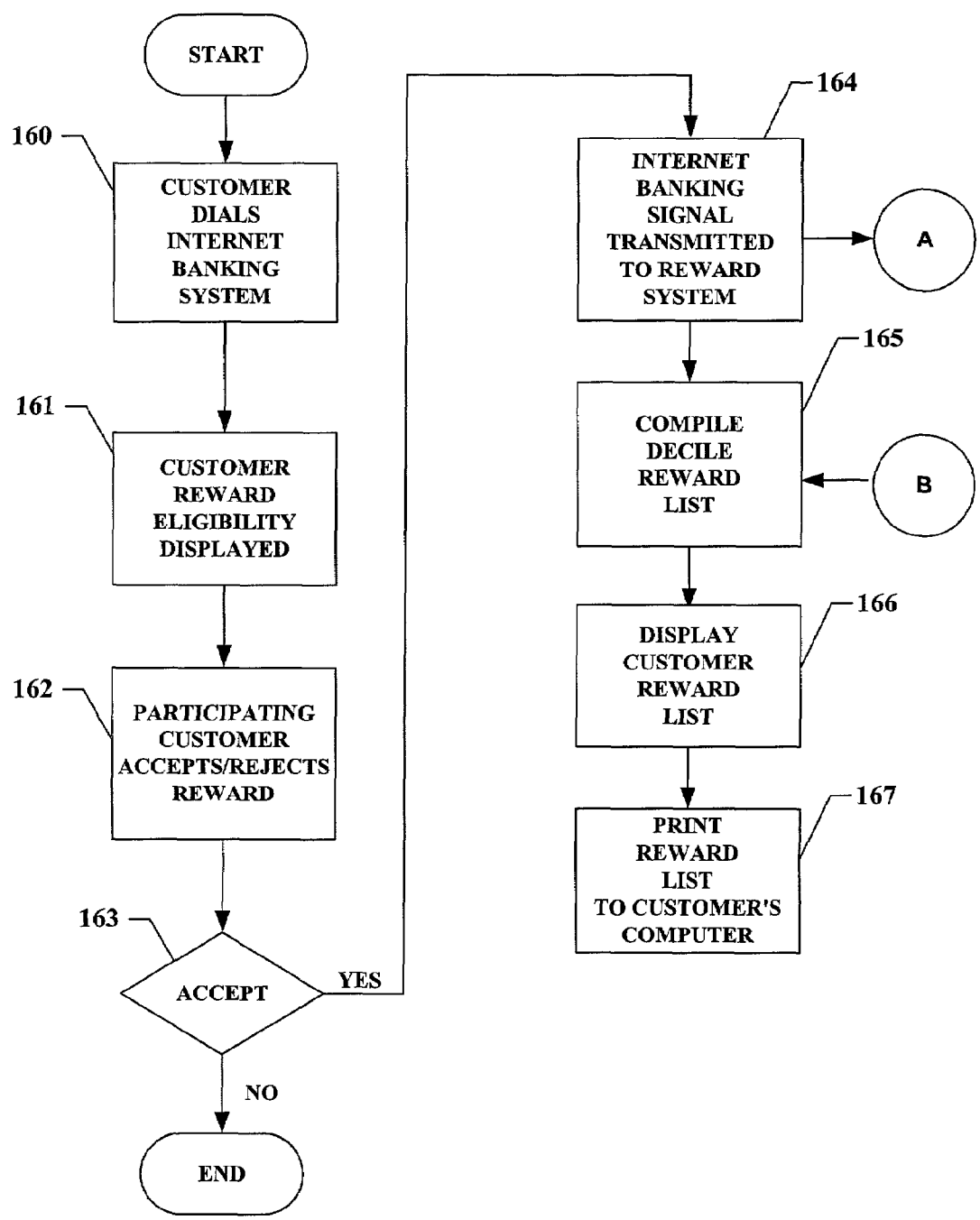
FIG. 16 is a flow chart detailing a method of distributing an incentives list to a customer via a personal computer (PC) or through use of home banking via the Internet.

FIG. 16 depicts a method of issuing an incentives list 200 to a customer via a financial institution's PC/Internet network. The method begins when a customer connects to the financial institution's Internet site 160. The display may be created using any display language including, but not limited to HTML, Java script or other software. Preferably, the bank customer may download an incentives list 200 by clicking an icon. If accepted 163, a signal 164 is communicated to the VDS application 37. When the signal is received, an incentives list 200 is compiled for the customer 165. The incentives list 200 is then displayed 166 on the customer's PC/Internet computer display. If the customer accepts the incentives list 200, a print cycle 167 is executed from the customer's PC/Internet computer.

While various embodiments of this invention have been set forth above, these descriptions of the preferred embodiment are given for purposes of illustration and explanation. Variations, changes, modifications, and departures from the systems and methods disclosed above may be adopted without departure from the spirit and scope of this invention.

I claim:

1. A method for targeting at least one incentive from at least one participant to at least one financial institution customer, the method being implemented on an incentive distribution system, the method comprising:

receiving incentive information from the at least one participant, the incentive information specifying at least one incentive matching a financial range limit associated with at least one of a plurality of decile levels;

receiving account transaction activity of a plurality of financial institution customers, the account transaction activity comprising account transaction data representing daily, monthly, and yearly account transaction activity associated with accounts of the plurality of financial institution customers at a financial institution;

analyzing by a computer the account transaction data representing daily, monthly, and yearly account transaction activity associated with accounts of the plurality of financial institution customers at the financial institution, wherein analyzing the account transaction data comprises:

determining a plurality of variations in the account transaction data;

associating each of the plurality of variations with one of the plurality of financial institution customers;

deriving an upper financial range from the plurality of variations in the account transaction data;

deriving a lower financial range from the plurality of variations in the account transaction data;

establishing a decile ranking dataset partitioned into the plurality of decile levels based on the upper financial range and the lower financial range, each of the plurality of decile levels being associated with the financial range limit determined from at least one of the upper financial range and the lower financial range;

categorizing each of the plurality of variations in the account transaction data into at least one of the plurality of decile levels; and generating a financial range ranking for each of the plurality of financial institution customers associated with each of the plurality of decile levels based on the plurality of variations;

matching by the computer to at least one of the plurality of financial institution customers based on the financial range ranking for each of the plurality of financial institution customers associated with the at least one of the plurality of decile levels matched to the at least one incentive; and distributing the at least one incentive to the at least one of the plurality of financial institution customers matched to the at least one incentive.

2. The method of claim 1, wherein the account transaction data comprises data representing a plurality of transactions in at least one demand deposit account associated with at one of the plurality of financial institution customers, the at least one demand deposit account being managed by the financial institution.

3. The method of claim 1, wherein the account transaction data comprises data representing a plurality of transactions in at least one interest bearing account associated with at least one of the plurality of financial institution customers, the at least one interest bearing account being managed by the financial institution.

4. The method of claim 1, wherein the account transaction data comprises data representing a plurality of transactions in at least one loan account associated with at least one of the plurality of financial institution customers, the at least one loan account being managed by the financial institution.

5. The method of claim 1, wherein the account transaction data comprises data representing a plurality of secondary transaction types in at least one account associated with at least one of the plurality of financial institution customers, the account being managed by a financial institution.

6. The method of claim 1, wherein each of the plurality of decile levels is associated with demographic information, wherein matching the at least one incentive to at least one of the plurality of financial institution customers is based on matching at least one demographic parameter to the demographic information.

7. The method of claim 6, wherein the at least one demographic parameter comprises at least one of:

financial institution customer income;
financial institution customer age;
financial institution customer gender;
financial institution customer occupation;
financial institution customer education level;
financial institution customer residence location; or
financial institution customer family size.

8. The method of claim 1, wherein receiving incentive information from the at least one participant comprises receiving incentive information from a plurality of participants, the incentive information specifying a plurality of incentives matching the financial range limit associated with at least one of the plurality of decile levels, the method further comprising:

selecting at least one of the plurality of incentives for each of the plurality of decile levels.

9. The method of claim 8, further comprising:

establishing a plurality of incentive redemption fee accounts, each of plurality of incentive redemption fee accounts being associated with one of the plurality of participants.

10. The method of claim 1, wherein the incentive information from the at least one participant comprises an identification code for each incentive specified by the incentive information.

11. The method of claim 1, further comprising:

receiving a redemption log from the at least one participant, the redemption log comprising redemption history data representing if the at least one financial institution customer redeemed the incentive, wherein the redemption log is received at least one of daily, weekly, or monthly.

12. The method of claim 11, further comprising:

associating the redemption history data with at least one of the plurality of decile levels.

13. The method of claim 12, further comprising:

adjusting the at least one incentive matched to at least one of the plurality of decile levels based on the redemption history data.

14. The method of claim 1, wherein distributing the at least one incentive to the at least one of the plurality of financial institution customers matched to the at least one incentive comprises distributing the at least one incentive through at least one of:

an automated teller network;
a teller system;
a monthly account statement;
direct mail system;
customer service system;
telephone system; or
internet banking system.

15. A system for targeting at least one incentive from at least one participant to at least one financial institution customer, the system comprising:
- a computer system having a customer application database for storing account transaction activity of each of a plurality of financial institution customers, the account transaction activity comprising account transaction data representing daily, monthly, and yearly account transaction activity associated with accounts of the plurality of financial institution customers at a financial institution;
- the computer system having a transaction decile ranking database for analyzing the account transaction data representing daily, monthly, and yearly account transaction activity associated with accounts of the plurality of financial institution customers at the financial institution, wherein the transaction decile ranking database is configured to analyze the account transaction data by:
  - determining a plurality of variations in the account transaction data;
  - associating each of the plurality of variations with one of the plurality of financial institution customers;
  - deriving an upper financial range from the plurality of variations in the account transaction data;
  - deriving a lower financial range from the plurality of variations in the account transaction data;
  - establishing a decile ranking dataset partitioned into a plurality of decile levels based on the upper financial range and the lower financial range, each of the plurality of decile levels being associated with a financial range limit determined from at least one of the upper financial range and the lower financial range;
  - categorizing each of the plurality of variations in the account transaction data into at least one of the plurality of decile levels; and
  - generating a financial range ranking for each of the plurality of financial institution customers associated with each of the plurality of decile levels based on the plurality of variations;
- the computer system having a discount/incentive database for storing incentive information from the at least one participant, the incentive information specifying at least one incentive matching the financial range limit associated with at least one of the plurality of decile levels; and
- the computer system having a decile discount distribution model for matching the at least one incentive to at least one of the plurality of financial institution customers based on the financial range ranking for each of the plurality of financial institution customers associated with the at least one of the plurality of decile levels matched to the at least one incentive, wherein the decile discount distribution model is configured to distribute the at least one incentive to the at least one of the plurality of financial institution customers matched to the at least one incentive.

16. The system of claim 15, wherein the decile discount distribution model is a computer server.

17. The system of claim 15, wherein each of the discount/incentive database, the transaction decile ranking database, the customer application database, are the decile discount distribution model are components of a computer system managed by the financial institution.

18. The system of claim 15, wherein the decile discount distribution model is configured to distribute the at least one incentive to the at least one of the plurality of financial institution customers matched to the at least one incentive through at least one of:
- an automated teller network;
- a teller system;
- a monthly account statement;
- direct mail system;
- customer service system;
- telephone system; or
- internet banking system.

19. A method for targeting at least one incentive from at least one participant to at least one financial institution customer, the method comprising:
- receiving, by a computer system account transaction activity of each of a plurality of financial institution customers, the account transaction activity comprising account transaction data representing daily, monthly, and yearly account transaction activity associated with accounts of the plurality of financial institution customers at a financial institution;
- analyzing by the computer system the account transaction data representing daily, monthly, and yearly account transaction activity associated with accounts of the plurality of financial institution customers at the financial institution, wherein analyzing the account transaction data by the computer system comprises:
  - determining a plurality of variations in the account transaction data;
  - associating each of the plurality of variations with one of the plurality of financial institution customers;
  - deriving an upper financial range from the plurality of variations in the account transaction data;
  - deriving a lower financial range from the plurality of variations in the account transaction data;
  - establishing a decile ranking dataset partitioned into a plurality of decile levels based on the upper financial range and the lower financial range, each of the plurality of decile levels being associated with a financial range limit determined from at least one of the upper financial range and the lower financial range;
  - categorizing each of the plurality of variations in the account transaction data into at least one of the plurality of decile levels; and
  - generating a financial range ranking for each of the plurality of financial institution customers associated with each of the plurality of decile levels based on the plurality of variations;
- receiving by the computer system incentive information from the at least one participant, the incentive information specifying at least one incentive matching the financial range limit associated with at least one of the plurality of decile levels;
- matching by the computer system the at least one incentive to at least one of the plurality of financial institution customers based on the financial range ranking for each of the plurality of financial institution customers associated with the at least one of the plurality of decile levels matched to the at least one incentive; and
- distributing by the computer system the at least one incentive to the at least one of the plurality of financial institution customers matched to the at least one incentive.

* * * * *